US012682931B2

(12) United States Patent
Clark et al.

(10) Patent No.: US 12,682,931 B2
(45) Date of Patent: Jul. 14, 2026

(54) GENERATING AUDIOVISUAL CONTENT BASED ON VIDEO CLIPS

(71) Applicant: Google LLC, Mountain View, CA (US)

(72) Inventors: Nicholas James Clark, London (GB); Glen Murphy, Palo Alto, CA (US); Jason Briggs Cornwell, Lafayette, CA (US); Conor Patrick O'Sullivan, San Francisco, CA (US); Philip Loyd Burk, Larkspur, CA (US); Eunyoung Park, Sunnyvale, CA (US); Philip Francis Rowe, Portland, OR (US); Donald Peter Turner, Fetcham (GB); Karl David Möllerstedt, Stockholm (SE); Finn Åke Axel Ericson, Stockholm (SE); Svante Sten Johan Stadler, Stockholm (SE); Johan Philip Claesson, Stockholm (SE); Ola Fredrik Josefsson, Stockholm (SE)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 18/292,223

(22) PCT Filed: Jul. 27, 2021

(86) PCT No.: PCT/US2021/043276
§ 371 (c)(1),
(2) Date: Jan. 25, 2024

(87) PCT Pub. No.: WO2023/009104
PCT Pub. Date: Feb. 2, 2023

(65) Prior Publication Data
US 2024/0282341 A1     Aug. 22, 2024

(51) Int. Cl.
*G11B 27/031*     (2006.01)
*G06F 3/0483*     (2013.01)
(Continued)

(52) U.S. Cl.
CPC .......... *G11B 27/031* (2013.01); *G06F 3/0483* (2013.01); *G06F 3/04847* (2013.01); *G10H 1/368* (2013.01)

(58) Field of Classification Search
CPC . G11B 27/031; G06F 3/0483; G06F 3/04847; G10H 1/368
See application file for complete search history.

(56) References Cited

U.S. PATENT DOCUMENTS 6,362,411 B1     3/2002   Suzuki et al.
7,623,755 B2 *  11/2009   Kuspa ................... G11B 27/34
                                                            386/285
(Continued)

FOREIGN PATENT DOCUMENTS

CN     101080763 B     5/2014
JP     H09185376 A     7/1997
(Continued)

OTHER PUBLICATIONS

Diefenbach, Ryan, "OP-Z (New) Photomatic Video Update—Tutorial," YouTube, https://youtu.be/LELbQH72DVc, downloaded Jan. 25, 2024, 3 pages.
(Continued)

*Primary Examiner* — Mishawn N. Hunter
(74) *Attorney, Agent, or Firm* — McDonnell Boehnen Hulbert & Berghoff LLP

(57)     ABSTRACT

A method includes capturing, by a content generation component of a computing device, initial content comprising video, and audio associated with the video; identifying one or more audio clips in the audio associated with the video based on one or more transient points in the audio; extracting, for each audio clip, a corresponding video clip from the video of the initial content; providing a control interface to enable a user-generated sequence of audio clips, wherein each audio clip in the sequence of audio clips is selected
(Continued)

from the one or more identified audio clips; generating new audiovisual content comprising a sequence of video clips to correspond to the user-generated sequence of audio clips, wherein each video clip in the sequence of video clips is the extracted corresponding video clip for each audio clip in the user-generated sequence of audio clips; and providing, by the control interface, the new audiovisual content.

20 Claims, 11 Drawing Sheets

(51) Int. Cl.
G06F 3/04847 (2022.01)
G10H 1/36 (2006.01)

(56) References Cited

U.S. PATENT DOCUMENTS

| | | | | |
|---|---|---|---|---|
| 8,843,375 | B1 * | 9/2014 | Ubillos | G10L 21/10 |
| | | | | 704/278 |
| 10,372,991 | B1 * | 8/2019 | Niemasik | G11B 27/031 |
| 2006/0112411 | A1 | 5/2006 | Takai et al. | |
| 2012/0014673 | A1 | 1/2012 | O'Dwyer | |
| 2015/0179157 | A1 | 6/2015 | Chon et al. | |
| 2016/0012853 | A1 | 1/2016 | Cabanilla et al. | |
| 2016/0336039 | A1 | 11/2016 | Leiberman et al. | |
| 2018/0295427 | A1 | 10/2018 | Leiberman et al. | |
| 2019/0051272 | A1 | 2/2019 | Lewis et al. | |
| 2023/0019025 | A1 * | 1/2023 | Charantimath | G11B 27/28 |

FOREIGN PATENT DOCUMENTS

| | | |
|---|---|---|
| JP | 2000221982 A | 8/2000 |
| JP | 2021507550 A | 2/2021 |

OTHER PUBLICATIONS

International Searching Authority, International Search Report and Written Opinion, mailed Apr. 7, 2022, issued in connection with International Patent Application No. PCT/US2021/043276, filed Jul. 27, 2021, 10 pages.

Teenage Engineering, "OP-Z app," YouTube, https://www.youtube.com/watch?v=iOqaJJhEQB0, downloaded Jan. 25, 2024, 3 pages.

Teenage Engineering, "PO-33 guide—teenage engineering," https://teenage.engineering/guides/po-33/en, downloaded May 21, 2021, 8 pages.

Unknown, "teenageengineering/videolab," GitHub, https://github.com/teenageengineering/videolab, downloaded, Jan. 25, 2024, 2 pages.

* cited by examiner

GENERATING AUDIOVISUAL CONTENT BASED ON VIDEO CLIPS

This application is a national stage application under 35 U.S.C. § 371 of International Application No. PCT/US2021/ 043276, filed Jul. 27, 2021, the disclosure of which is explicitly incorporated by reference herein in its entirety.

BACKGROUND

Many modern computing devices, such as mobile phones, personal computers, and tablets, include image capture devices, such as still and/or video cameras. The image capture devices can capture images, such as images that include people, animals, landscapes, and/or objects. The present disclosure relates generally to generating audiovisual content from captured videos.

SUMMARY

Aspects of the subject technology relate to creation of audiovisual content from captured video. Relevant portions of audio content can be extracted from a video, along with corresponding portions of the video. A user can then sequence such portions of the audio content to create new audiovisual content.

Accordingly, in a first example embodiment, a device is provided that includes a graphical user interface configured to enable generation of audiovisual content. The device also includes one or more processors. The device further includes data storage. The data storage has stored thereon computer-executable instructions that, when executed by the one or more processors, cause the computing device to carry out functions The functions include capturing, by a content generation component of the computing device, initial content comprising video, and audio associated with the video. The functions further include identifying one or more audio clips in the audio associated with the video based on one or more transient points in the audio. The functions also include extracting, for each audio clip of the one or more identified audio clips, a corresponding video clip from the video of the initial content. The functions additionally include providing, via the graphical user interface, a control interface to enable a user-generated sequence of audio clips, wherein each audio clip in the sequence of audio clips is selected from the one or more identified audio clips. The functions further include generating new audiovisual content comprising a sequence of video clips to correspond to the user-generated sequence of audio clips, wherein each video clip in the sequence of video clips is the extracted corresponding video clip for each audio clip in the user-generated sequence of audio clips. The functions also include providing, by the control interface, the new audiovisual content.

In a second example embodiment, a computer-implemented method is provided that includes capturing, by a content generation component of a computing device, initial content comprising video, and audio associated with the video. The computer-implemented method further includes identifying one or more audio clips in the audio associated with the video based on one or more transient points in the audio. The computer-implemented method also includes extracting, for each audio clip of the one or more identified audio clips, a corresponding video clip from the video of the initial content. The computer-implemented method additionally includes providing, via a graphical user interface of the computing device, a control interface to enable a user-generated sequence of audio clips, wherein each audio clip in the sequence of audio clips is selected from the one or more identified audio clips. The computer-implemented method further includes generating new audiovisual content comprising a sequence of video clips to correspond to the user-generated sequence of audio clips, wherein each video clip in the sequence of video clips is the extracted corresponding video clip for each audio clip in the user-generated sequence of audio clips. The computer-implemented method also includes providing, by the control interface, the new audiovisual content.

In a third example embodiment, an article of manufacture including a non-transitory computer-readable medium is provided having stored thereon program instructions that, upon execution by one or more processors of a computing device, cause the computing device to carry out operations. The operations include capturing, by a content generation component of the computing device, initial content comprising video, and audio associated with the video. The operations also include identifying one or more audio clips in the audio associated with the video based on one or more transient points in the audio. The operations also include extracting, for each audio clip of the one or more identified audio clips, a corresponding video clip from the video of the initial content. The operations additionally include providing, via a graphical user interface of the computing device, a control interface to enable a user-generated sequence of audio clips, wherein each audio clip in the sequence of audio clips is selected from the one or more identified audio clips. The operations further include generating new audiovisual content comprising a sequence of video clips to correspond to the user-generated sequence of audio clips, wherein each video clip in the sequence of video clips is the extracted corresponding video clip for each audio clip in the user-generated sequence of audio clips. The operations additionally include providing, by the control interface, the new audiovisual content. In a fourth example embodiment, a system is provided that includes means for capturing, by a content generation component of a computing device, initial content comprising video, and audio associated with the video; means for identifying one or more audio clips in the audio associated with the video based on one or more transient points in the audio; means for extracting, for each audio clip of the one or more identified audio clips, a corresponding video clip from the video of the initial content; means for providing, via a graphical user interface of the computing device, a control interface to enable a user-generated sequence of audio clips, wherein each audio clip in the sequence of audio clips is selected from the one or more identified audio clips; means for generating new audiovisual content comprising a sequence of video clips to correspond to the user-generated sequence of audio clips, wherein each video clip in the sequence of video clips is the extracted corresponding video clip for each audio clip in the user-generated sequence of audio clips; and means for providing, by the control interface, the new audiovisual content.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Video and/or sound editing can be an elaborate process that generally requires specialized equipment, a studio environment, and experienced editors to cut, edit, and/or synthesize audiovisual content to generate soundtracks, video content, and so forth. Operating systems of computing devices, for example those targeted for mobile devices, have simple built-in audio processing effects and offer limited options to create and/or edit audiovisual content. Some operating systems may be provided with audio processing architectures that may be utilized to create new audio content. Some mobile applications may offer an ability to merge different sound tracks, and/or create new beats for existing soundtracks.

In accordance with one or more implementations, methods and systems for creation of audiovisual content are herein disclosed. According to various aspects of the subject technology, user-friendly graphical user interfaces are provided that enable a user to create audiovisual content from existing video content. For example, audio clips comprising voices, instrumental sounds, and/or other sounds can be extracted from a video. In some aspects of the subject technology, percussive sounds can be set to different rhythms, melodic sounds can be re-pitched across a collection of notes, and so forth, to generate audio clips. A user may then synthesize these audio clips to create new audio content. The audio content can then be played along with portions of video clips corresponding to the extracted audio clips.

II. Example Devices

Figure 1:
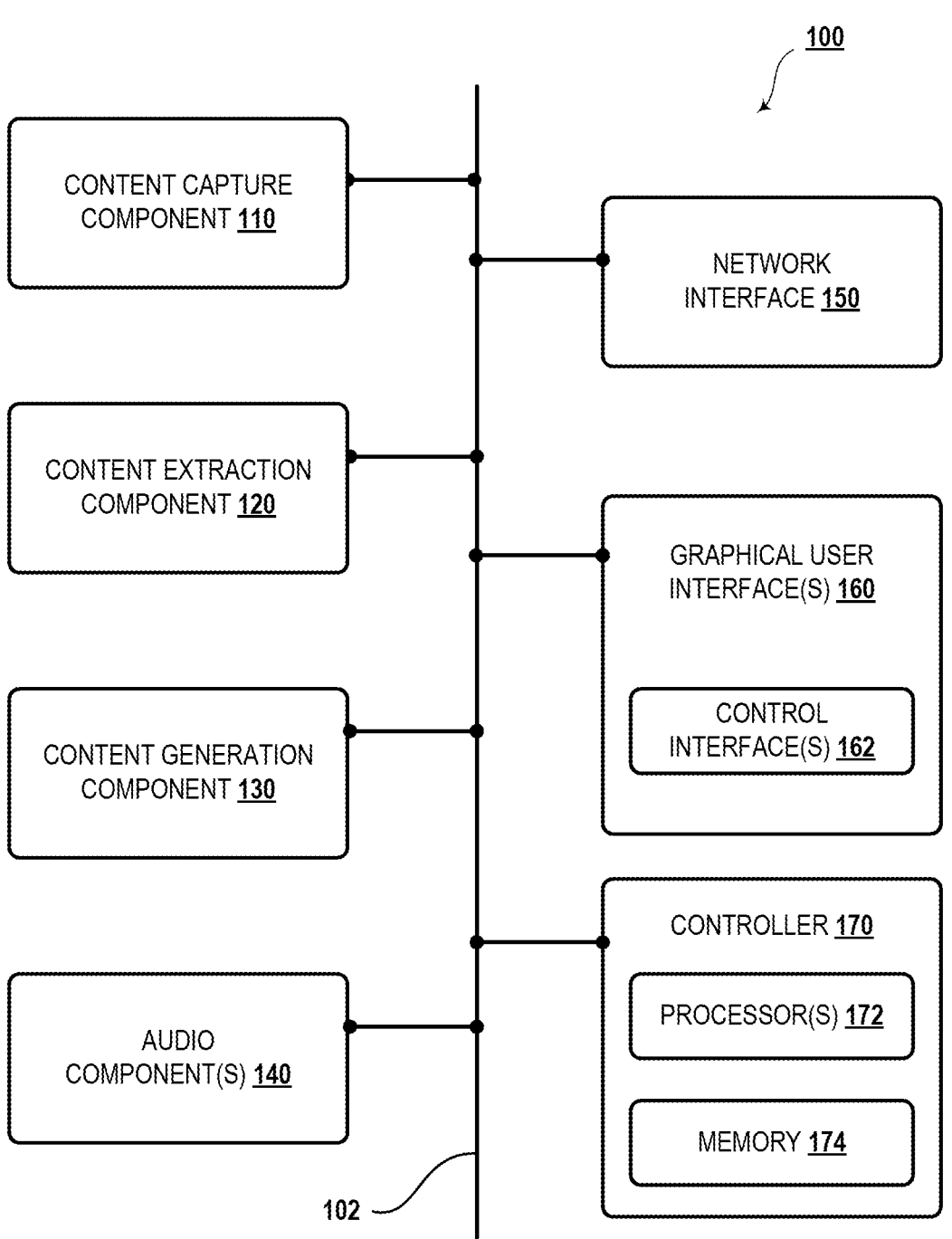
FIG. 1 illustrates a computing device, in accordance with example embodiments.

FIG. 1 illustrates computing device 100, in accordance with example embodiments. Computing device 100 can be a computer, phone, personal digital assistant (PDA), or any other sort of electronic device. Such an electronic system includes various types of computer readable media and interfaces for various other types of computer readable media. Computing device 100 includes a bus 102, a content capture component 110, a content extraction component 120, a content generation component 130, one or more audio components 140, network interface 150, graphical user interface(s) 160, control interface(s) 162, and controller 170, comprising processor(s) 172 and memory 174. In some examples, computing device 100 may take the form of a desktop device, a server device, or a mobile device. Computing device 100 may be configured to interact with an environment. For example, computing device 100 may record audio signals from an environment around computing device 100.

Bus 102 collectively represents all system, peripheral, and chipset buses that communicatively connect the numerous internal devices of computing device 100. For instance, bus 102 communicatively connects processor(s) 172 with memory 174. Bus 102 also connects to input and output device interfaces (not shown). The input device interface enables the user to communicate information and select commands to computing device 100. Input devices used with the input device interface include, for example, alphanumeric keyboards, pointing devices (also called "cursor control devices"), and sound capturing devices (e.g., microphones). The output device interface enables, for example, the playback of sound, the display of images generated by computing device 100, and so forth. Output devices used with the output device interface include, for example, printers, display devices (e.g., cathode ray tubes (CRT) or liquid crystal displays (LCD)), and sound playback devices (e.g., speakers). Some implementations include devices, for example, a touchscreen that functions as both input and output devices. Bus 102 also couples computing device 100 to a network (not shown) through network interface 150. In this manner, the computer can be a part of a network of computers (for example, a LAN, a WAN, or an Intranet, or a network of networks, for example, the Internet). Any or all components of computing device 100 can be used in conjunction with the subject disclosure.

In some embodiments, computing device 100 can include content capture component 120, such as still and/or video cameras. Content capture component 120 can capture images, such as images that include people, animals, landscapes, and/or objects. Content can include, still images, audio, video, and/or audiovisual content. For example, content capture component 120 can capture initial content comprising video, and audio associated with the video.

In some embodiments, computing device 100 can include content extraction component 120. For example, content extraction component 120 can identify one or more audio clips in the audio associated with the video based on one or more transient points in the audio. Also, for example, content extraction component 120 can extract, for each audio clip of the one or more identified audio clips, a corresponding video clip from the video of the initial content. The term "clip" as used herein generally refers to a portion of an audio or video. A clip can be identified based on temporal markings, and/or metadata associated with audiovisual content.

In some embodiments, computing device 100 can include content generation component 130. For example, content generation component 130 can generate new audiovisual content comprising a sequence of video clips to correspond to the user-generated sequence of audio clips. Each video clip in the sequence of video clips is the extracted corresponding video clip for each audio clip in the user-generated sequence of audio clips.

In some embodiments, computing device 100 can include one or more audio component(s) 140. One or more audio component(s) 140 can include audio output components that can be configured to output audio to an environment of computing device 100. In some embodiments, the audio output components may be a part of computing device 100. For example, the audio output components may include a plurality of speakers located on computing device 100. In some embodiments, the audio output components may be part of a second device communicatively coupled to computing device 100. For example, the audio output components may be a network device configured to output audio, one or more speakers, an audio amplifier system, a headphone, a car audio, and so forth.

In some embodiments, one or more audio component(s) 140 can include audio input components. Audio input components can be configured to record audio from an environment of computing device 100. For example, as a camera of computing device 100 captures video images, the audio input components can be configured to simultaneously record audio associated with the video images. In some embodiments, the audio input components may be a part of computing device 100. For example, audio input components may include a plurality of microphones located on computing device 100. In some embodiments, the audio input components may be part of a second device communicatively coupled to computing device 100. For example, the audio input components may be a network device configured to record audio, such as a microphone (e.g., in a headphone, a car audio), and so forth. For example, audio input components may be a smart device (e.g., a smart watch, a mobile device) configured to capture audio and communicate the audio signal to computing device 100.

Network interface 150 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 150 can be configured to provide reliable, secured, and/or authenticated communications. For each communication described herein, information for facilitating reliable communications (e.g., secured audio content delivery) can be provided, perhaps as part of a secure data packet transmission (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Graphical user interface(s) 160 may be configured to provide output signals to a user by way of one or more screens (including touch screens), cathode ray tubes (CRTs), liquid crystal displays (LCDs), light emitting diodes (LEDs), displays using digital light processing (DLP) technology, and/or other similar technologies. Graphical user interface(s) 160 may also be configured to generate audible outputs, such as with a speaker, speaker jack, audio output port, audio output device, earphones, and/or other similar devices. Graphical user interface(s) 160 may further be configured with one or more haptic components that can generate haptic outputs, such as vibrations and/or other outputs detectable by touch and/or physical contact with computing device 100.

Graphical user interface(s) 160 may include control interface(s) 162. Control interface(s) 162 can enable a user to generate a sequence of audio clips, where each audio clip in the sequence of audio clips is selected from a collection of identified audio clips. Control interface(s) 162 can provide the new audiovisual content. Control interface(s) 162 can include a plurality of selectable tabs corresponding to a plurality of audio channels. User selection of a tab of the plurality of selectable tabs enables user access to one or more channel interfaces to interact with one or more of an audio clip or a video clip in the audio channel corresponding to the user selected tab. In some embodiments, the plurality of audio channels can include audio clips corresponding to one or more of a melodic note, a percussive sound, a musical composition, an instrumental sound, a silence, or a vocal phrase. In some embodiments, each audio channel of the plurality of audio channels can be associated with a given audiovisual content different from the initial content.

In some embodiments, the one or more channel interfaces of control interface(s) 162 can include an interface with one or more icons corresponding to the one or more identified audio clips. The user-generated sequence of audio clips can be based on user indication of selecting at least one icon of the one or more icons to generate the sequence.

In some embodiments, the one or more channel interfaces of control interface(s) 162 can include an interface displaying a plurality of user-generated sequences, each sequence of the plurality of user-generated sequences corresponding to the plurality of audio channels, and further including a selectable option enabling a user to chain the one or more sequences to generate a new sequence.

In some embodiments, the one or more channel interfaces of control interface(s) 162 can include an interface displaying a plurality of user-generated sequences, each sequence of the plurality of user-generated sequences corresponding to the plurality of audio channels, and further including a selectable option enabling a user to mix the one or more sequences to generate a new audio track.

In some embodiments, the one or more channel interfaces of control interface(s) 162 can include an interface displaying a pair of coordinate axes. A horizontal axis corresponds to a plurality of pitch adjustments for the user-generated sequence, and a vertical axis corresponds to a plurality of simultaneously adjustable audio filter adjustments for the user-generated sequence.

In some embodiments, the one or more channel interfaces of control interface(s) 162 can include an interface displaying a plurality of respective volume controls for the plurality of audio channels. The plurality of respective volume controls can enable a user to simultaneously control volume settings of each of the plurality of audio channels.

In some embodiments, the one or more channel interfaces of control interface(s) 162 can include an interface displaying a first tool to adjust a tempo, a second tool to adjust a swing, and a third tool to adjust a root musical note, for an audio clip in the sequence of audio clips.

In some embodiments, the one or more channel interfaces of control interface(s) 162 can include an interface displaying a plurality of video edit icons, and where user selection of a video edit icon of the plurality of video edit icons enables application of a video edit feature to a video clip of the sequence of video clips.

Controller 170 may include one or more processors 172 and memory 174. Processor(s) 172 can include one or more general purpose processors and/or one or more special purpose processors (e.g., display driver integrated circuit (DDIC), digital signal processors (DSPs), tensor processing units (TPUs), graphics processing units (GPUs), application specific integrated circuits (ASICs), etc.). Processor(s) 172 can be a single processor or a multi-core processor in different implementations. Processor(s) 172 may be configured to execute computer-readable instructions that are contained in memory 174 and/or other instructions as described herein.

Memory 174 may include one or more non-transitory computer-readable storage media that can be read and/or accessed by processor(s) 172. The one or more non-transitory computer-readable storage media can include volatile and/or non-volatile storage components, such as optical, magnetic, organic or other memory or disc storage, which can be integrated in whole or in part with at least one of processor(s) 172. In some examples, memory 174 can be implemented using a single physical device (e.g., one optical, magnetic, organic or other memory or disc storage unit), while in other examples, memory 174 can be implemented using two or more physical devices. ROM stores static data and instructions that are needed by processor(s) 172 and other modules of computing device 100. Some implementations use a permanent storage device that is a read-and-write memory device. For example, some implementations may use a removable storage device (for example, a floppy disk, flash drive) as a permanent storage device. Like the permanent storage device, a system memory may be used that is a read-and-write memory device. However, system memory is a volatile read-and-write memory, such as a random access memory. System memory may store some of the instructions and data that processor(s) 172 need at runtime. In some implementations, the processes of the subject disclosure are stored in the system memory, permanent storage device, or ROM. For example, the various memory units comprising memory 174 include instructions for displaying graphical elements and identifiers associated with respective applications, receiving a predetermined user input to display visual representations of shortcuts associated with respective applications, and displaying the visual representations of shortcuts. From these various memory units, processor(s) 172 retrieves instructions to execute and data to process in order to execute the processes of some implementations.

In example embodiments, processor(s) 172 are configured to execute instructions stored in memory 174 so as to carry out operations.

The operations may include capturing, by a content generation component of the computing device, initial content comprising video, and audio associated with the video.

The operations may include identifying one or more audio clips in the audio associated with the video based on one or more transient points in the audio. For example, in some embodiments, the identifying of the one or more audio clips in the initial content can include identifying, in a soundtrack of the initial content, one or more of a melodic note, a percussive sound, a musical composition, an instrumental sound, a change in audio intensity, a silence, or a vocal phrase. For example, audio corresponding to a melodic note, a percussive sound, a musical composition, an instrumental sound, a silence, or a vocal phrase may be identified based on transient points indicative of such audio. The transient points in the initial content can include one or more of a transient location, a pause, or a cut. In some embodiments, the identifying of the one or more audio clips in the initial content can be performed by a trained machine learning model. For example, a machine learning model can be trained to identify the transient points, and the trained machine learning model can be deployed to identify relevant audio clips. In some embodiments, the trained machine learning model can identify a classification for an audio clip of the one or more audio clips. For example, the trained machine learning model can identify that an audio clip corresponds to a melodic note, a percussive sound, a musical composition, a vocal phrase, and so forth. Then, based on the classification, a visual label may be generated for the audio clip. For example, if the audio clip corresponds to a percussive sound produced by a tap of a hand, then the visual label may be a schematic representation of a hand. Also, for example, if the audio clip corresponds to a melodic note produced by a violin, then the visual label may be a schematic representation of a violin. Additional and/or alternative visual labels may be generated. In some embodiments, the visual label can be displayed on a selectable icon corresponding to the audio clip via the control interface. For example, first key 540 of FIG. 5 may correspond to a first audio clip corresponding to a percussive sound produced by a tap of a hand, and the visual label on first key 540 is a schematic representation of a hand.

The operations may also include extracting, for each audio clip of the one or more identified audio clips, a corresponding video clip from the video of the initial content.

The operations may further include providing, via graphical user interface(s) 160, a control interface 162 to enable a user-generated sequence of audio clips, wherein each audio clip in the sequence of audio clips is selected from the one or more identified audio clips.

In some embodiments, the one or more identified audio clips can include a plurality of percussive sounds including an initial rhythm, and the operations to provide the control interface(s) 162 can include generating a plurality of modified versions of the plurality of percussive sounds, where the plurality of modified versions is associated with a modified rhythm different from the initial rhythm. The operations can further include providing, via control interface(s) 162, the plurality of modified versions of the plurality of percussive sounds, where the user-generated sequence of audio clips is based on the plurality of modified versions of the plurality of percussive sounds.

In some embodiments, an audio clip of the one or more identified audio clips can include a musical note, and the operations to provide the control interface(s) 162 can include generating a plurality of repitched versions of the musical note. The one or more channel interfaces of control interface(s) 162 can include an interface with one or more icons corresponding to the plurality of repitched versions of the musical note, and the user-generated sequence of audio clips can be based on user indication of selecting at least one icon of the one or more icons to generate the sequence.

The operations may also include generating new audiovisual content comprising a sequence of video clips to correspond to the user-generated sequence of audio clips, wherein each video clip in the sequence of video clips is the extracted corresponding video clip for each audio clip in the user-generated sequence of audio clips.

The operations may further include identifying one or more second audio clips in a second initial content based on one or more second transient points in the second initial content. The operations may also include enabling, via the control interface, a second user-generated sequence of second audio clips, wherein each second audio clip in the sequence of second audio clips is selected from the one or more identified second audio clips. The generating of the new audiovisual content comprises generating a second sequence of video clips to correspond to the user-generated sequence of audio clips and the user-generated sequence of second audio clips.

The operations may also include providing, by control interface(s) 162, the new audiovisual content. In some embodiments, the providing of the new audiovisual content can include providing user selectable virtual tabs to enable automatic upload of the new audiovisual content to a social networking site.

III. Extraction of Audio and Video Clips

Figure 2:
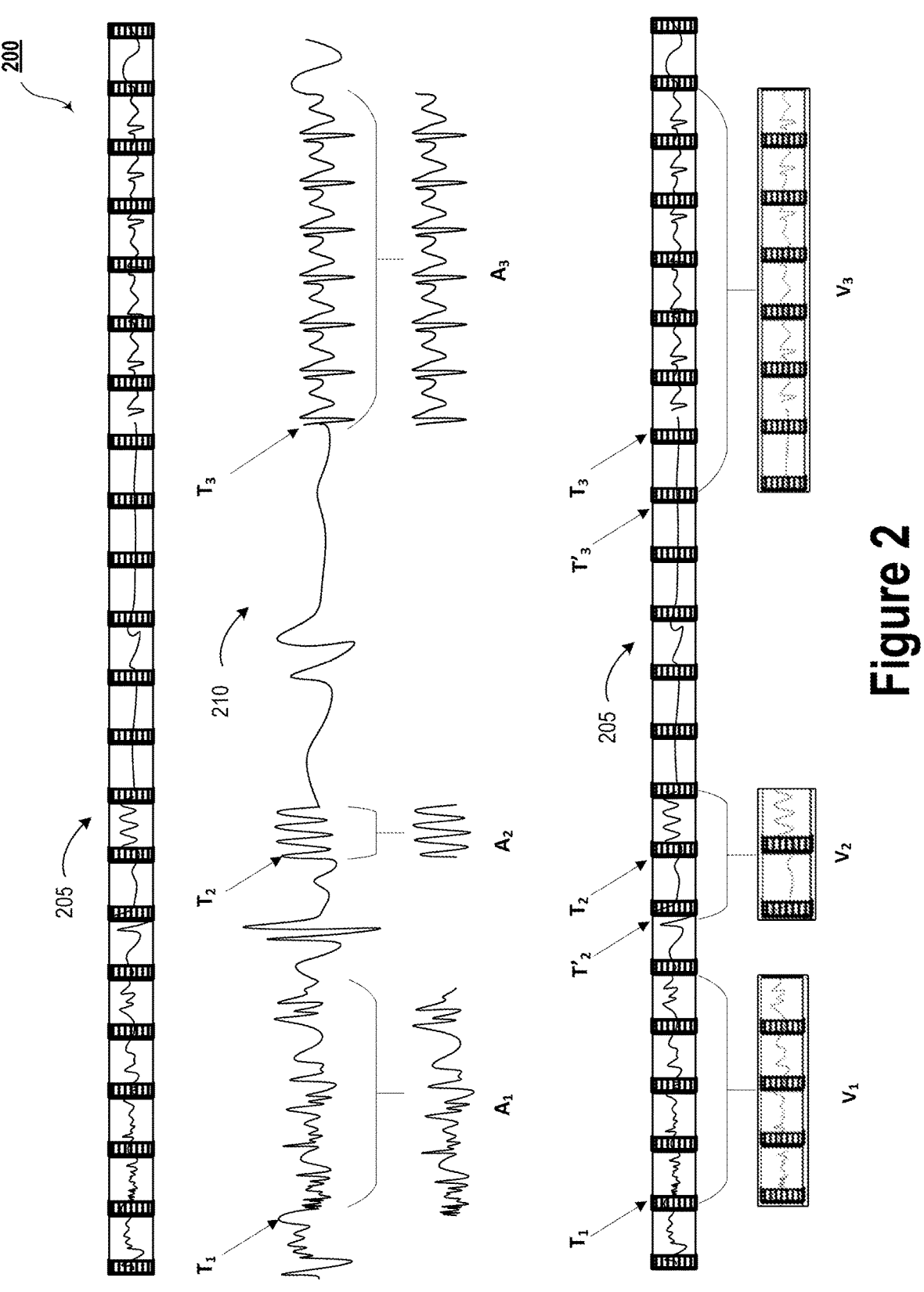
FIG. 2 is a schematic illustration of extraction of audio and video clips, in accordance with example embodiments.

FIG. 2 is a schematic illustration 200 of extraction of audio and video clips, in accordance with example embodiments. A media capture component (e.g., content capture component 110) of a computing device (e.g., computing device 100) may be used to capture initial content 205 comprising video, and audio associated with the video. In some embodiments, initial content 205 may be a previously captured audiovisual content that is stored in a memory (e.g., memory 174) of the computing device (e.g., computing device 100). Initial content 205 can generally comprise any video content that is accompanied by audio content. For example, initial content 205 can be a video of an object tapping different surfaces and generating a range of percussive sounds. As another example, initial content 205 can be a video of a kettle blowing steam and generating a whistling sound. Also, for example, initial content 205 can be a video of a newsreel where one or more individuals are conveying some news. In some instances, initial content 205 can be a video of an orchestra playing a musical composition, a video of musical recital (e.g., piano, flute, and so forth), a video of a sports broadcast, a video of a musical concert, and so forth. Also, for example, initial content 205 can be a video of a bird chirping, an aircraft taking off, a train arriving at a station, and so forth. In some instances, initial content 205 can be a video portion that is accompanied by silence.

In some embodiments, one or more audio clips may be identified in the audio associated with the video of initial content 205, based on one or more transient points in the initial content 205. As described herein, initial content 205 can be associated with an audio track 210. As illustrated, audio track 210 is a schematic representation of a waveform corresponding to an audio track. In some instances, audio track 210 may be extracted from initial content 205 for further analysis. Audio track 210 may comprise portions of audio that may be of interest to a user. For example, audio track 210 can include audio of percussive sounds, melodic notes, human voices, silence, and/or other audio that may be of interest. Each such audio portion has a starting point in audio track 210 indicative of a change in audio characteristics. A transient point, as used herein, may generally refer to such a starting point for an audio portion in an audio track.

A transient point may be detected based on an analysis of characteristics of audio track 210. For example, a change in audio intensity (e.g., a change in volume), an occurrence of speech (e.g., a person speaking), a change in a musical instrument (e.g., from flute to piano), a change in pitch, a change in an amount of background noise (e.g., a cheering crowd), a change from sound to silence, a change in a type of audio content (e.g., from speech to music, background noise, etc.), a change in a genre of music (e.g., classical, rock, blues, jazz, etc.), a point when a second song begins to play after a first song has been played, and so forth, can act as a transient point. A transient point may also be indicated by a cut, a pause, and so forth.

In some embodiments, a transient point may be detected by using a machine learning model trained to detect transient points. For example, a machine learning model may be trained on labeled data comprising audio tracks with previously known transient points indicative of a starting point of previously classified audio portions. Once trained, the machine learning model can take as input initial content 205 and/or audio track 210, and detect one or more transient points. Further description of such machine learning models are provided herein with reference to FIG. 10.

Transient points are associated with portions of audio that are of interest to a user. Accordingly, one or more audio clips can be identified for each of the one or more identified transient points. As illustrated in FIG. 2, transient points $T_1$, $T_2$, $T_3$ may be identified in audio track 215. For each of the transient points $T_1$, $T_2$, $T_3$, a corresponding audio clip $A_1$, $A_2$, $A_3$ may be respectively identified. In some embodiments, the one or more audio clips (e.g., audio clips $A_1$, $A_2$, $A_3$) may be extracted from initial content 205 and/or audio track 210.

In some embodiments, controller 170 may extract, for each audio clip of the one or more identified audio clips (e.g., audio clips $A_1$, $A_2$, $A_3$), a corresponding video clip from initial content 205. For example, a video clip $V_1$ corresponding to $A_1$, a video clip $V_2$ corresponding to $A_2$, and a video clip $V_3$ corresponding to $A_3$, may be identified. In some instances, the video clip may be offset slightly backwards (from the start of the audio clip or the transient point) so that the video clip captures images before the audio captured in the audio clip occurs. For example, when a vase is struck with a fork to produce a sound, video images leading up to the actual strike with the fork that produces the sound may be captured. Accordingly, a starting point for the video clip may be configured to be prior to the corresponding transient point. As illustrated, a starting point $T_2'$ for video clip $V_2$ is offset to be prior to transient point $T_2$ corresponding to audio clip $A_2$. Likewise, a starting point $T_3'$ for video clip $V_3$ is offset to be prior to transient point $T_3$ corresponding to audio clip $A_3$. However, for some video clips such as $V_1$, a starting point may be configured to coincide with the corresponding transient point $T_1$ for audio clip $A_1$.

In some embodiments, a fixed offset (e.g., N video frames) may be used between a starting point for a video clip and a transient point for the corresponding audio clip. In other embodiments, such an offset may be determined dynamically based on a type of audio and/or video. For example, when the audio clip comprises a vocal phrase, there may be no offset for the corresponding video clip. Also, for example, when the audio clip comprises a musical note played by a piano, there may be no offset for the corresponding video clip. However, when the audio clip comprises a sound of a train whistle, the start of the corresponding video clip may be offset to capture images of the train approaching a platform at a train station. Generally, a machine learning model can also be trained to identify whether a start of a video clip corresponding to an audio clip has to be offset with respect to the transient point for the audio clip. In some embodiments, a machine learning model can be trained to determine a length of the offset (e.g., a number of video frames).

Figure 3:
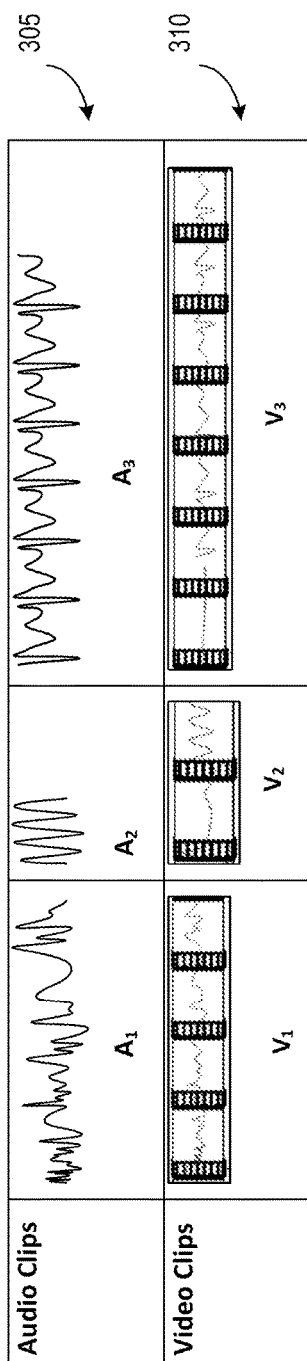
FIG. 3 is an example lookup table illustrating audio clips and corresponding video clips, in accordance with example embodiments.

FIG. 3 is an example lookup table 300 illustrating audio clips and corresponding video clips, in accordance with example embodiments. In some embodiments, controller 170 may store the extracted audio clips and corresponding video clips in a lookup table 300 in memory 174. For example, first row 305 of lookup table 300 may store the one or more identified audio clips (e.g., audio clips $A_1$, $A_2$, $A_3$), and second row 310 of lookup table 300 may store the one or more corresponding extracted video clips (e.g., video clips $V_1$, $V_2$, $V_3$).

A user may then create new audiovisual content by sequencing the one or more identified audio clips. For example, the user may select a particular audio clip and repeat it a certain number of times to generate new audio content. The corresponding video clip can be likewise sequenced to generate new audiovisual content. Generally, the user can use any combination of the one or more identified audio clips. Additionally, controller 170 may make available, via a control interface (e.g., control interface(s) 162), variations of the one or more identified audio clips (e.g., by varying respective audio characteristics such as bass, treble, pitch, rhythm, and so forth). Accordingly, a user may have access to a large repertoire of audio sounds from which to generate new musical creations.

Figure 4:
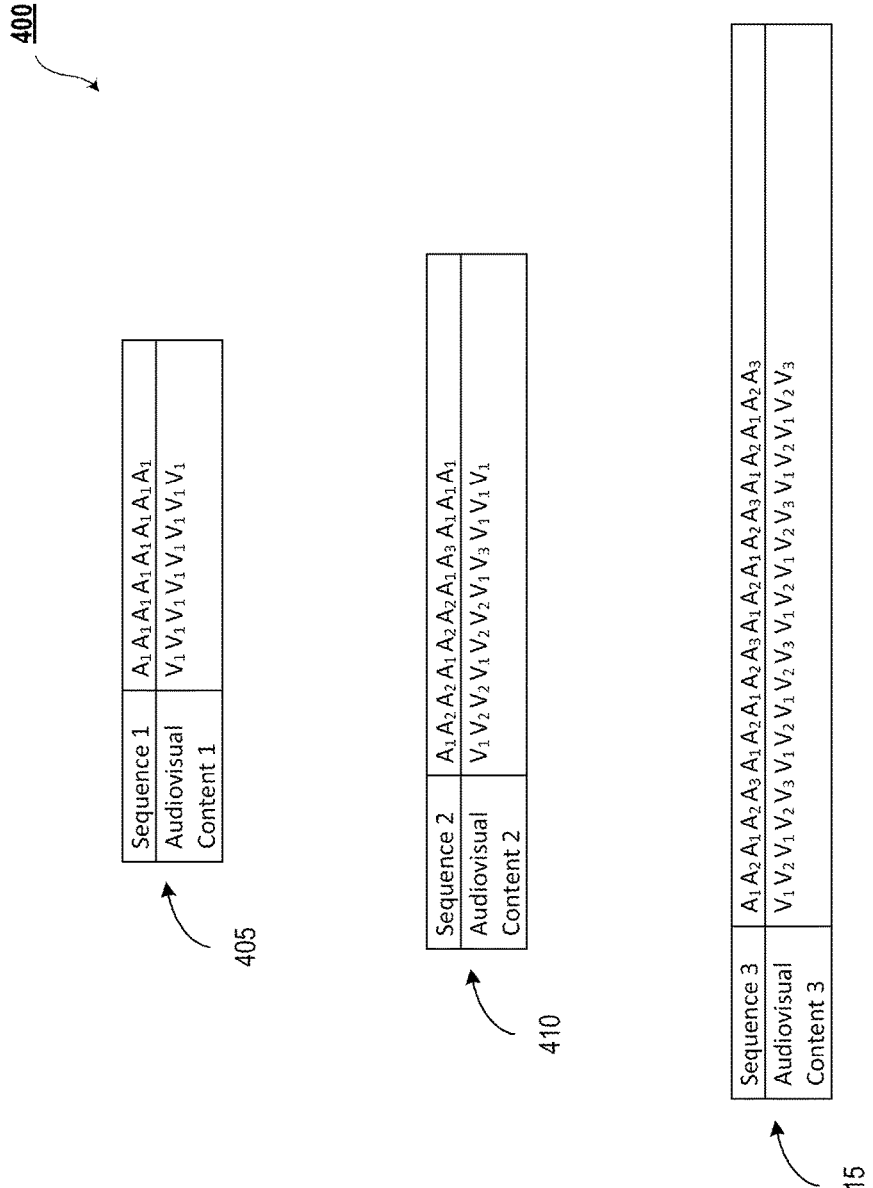
FIG. 4 illustrates example sequences of audio clips and corresponding audiovisual content, in accordance with example embodiments.

FIG. 4 illustrates example sequences 400 of audio clips and corresponding audiovisual content, in accordance with example embodiments. For example, an audio clip (e.g., audio clip $A_1$) of the one or more identified audio clips may include a musical note. A first sequence 405 may comprise a repetition of the audio clip $A_1$, such as, for example, $A_1A_1A_1A_1A_1A_1$, and the corresponding video clip $V_1$ may be similarly sequenced to generate first audiovisual content $V_1V_1V_1V_1V_1V_1V_1V_1$. As another example, a second sequence 410 may comprise a sequence of audio clips such as, for example, $A_1A_2A_2A_1A_2A_2A_1A_3A_1A_1A_1$, and the corresponding video clips may be similarly sequenced to generate second audiovisual content $V_1V_2V_2V_1V_2V_2V_1V_3V_1V_1V_1$. As another example, a third sequence 415 may comprise a sequence of a sequence of audio clips such as, for example, $A_1A_2A_1A_2A_3$, to generate a new sequence, $A_1A_2A_1A_2A_3A_1A_2A_1A_2A_3A_1A_2A_1A_2A_3A_1A_2A_1A_2A_3$, and the corresponding video clips may be similarly sequenced to generate third audiovisual content $V_1V_2V_1V_2V_3V_1V_2V_1V_2V_3V_1V_2V_1V_2V_3V_1V_2V_1V_2V_3$.

In some embodiments, a particular audio and/or video clip in a sequence may be edited to be a part of the sequence. For example, in the illustrative examples above, audio clip $A_k$ and/or video clip $V_j$ may correspond to edited versions of the audio clips and/or video clips, and the same notation is used herein for simplicity. For example, in first sequence 405, first audiovisual content $V_1V_1V_1V_1V_1V_1V_1V_1$ may include one or more edited versions of the video clip $V_1$ (e.g., with a different image texture, tint, contrast, brightness, color, sharpness, resolution, and so forth). As another example, in first sequence 405, the sequence of audio clips $A_1A_1A_1A_1A_1A_1$ may be repitched versions of audio clip $A_1$.

As may be noted, a plurality of sequences may be generated from a collection of audio clips and corresponding video clips, based on a length of the sequence, types of repetitions, different versions of one or more of the audio clips and/or video clips, and so forth. Also, for example, generated sequences may be further modified by changing a rhythm, audio intensity, and so forth. Also, for example, two or more generated sequences may be merged, mixed, and/or sequenced to generate additional sequences.

IV. Example User Interfaces

Figure 5:
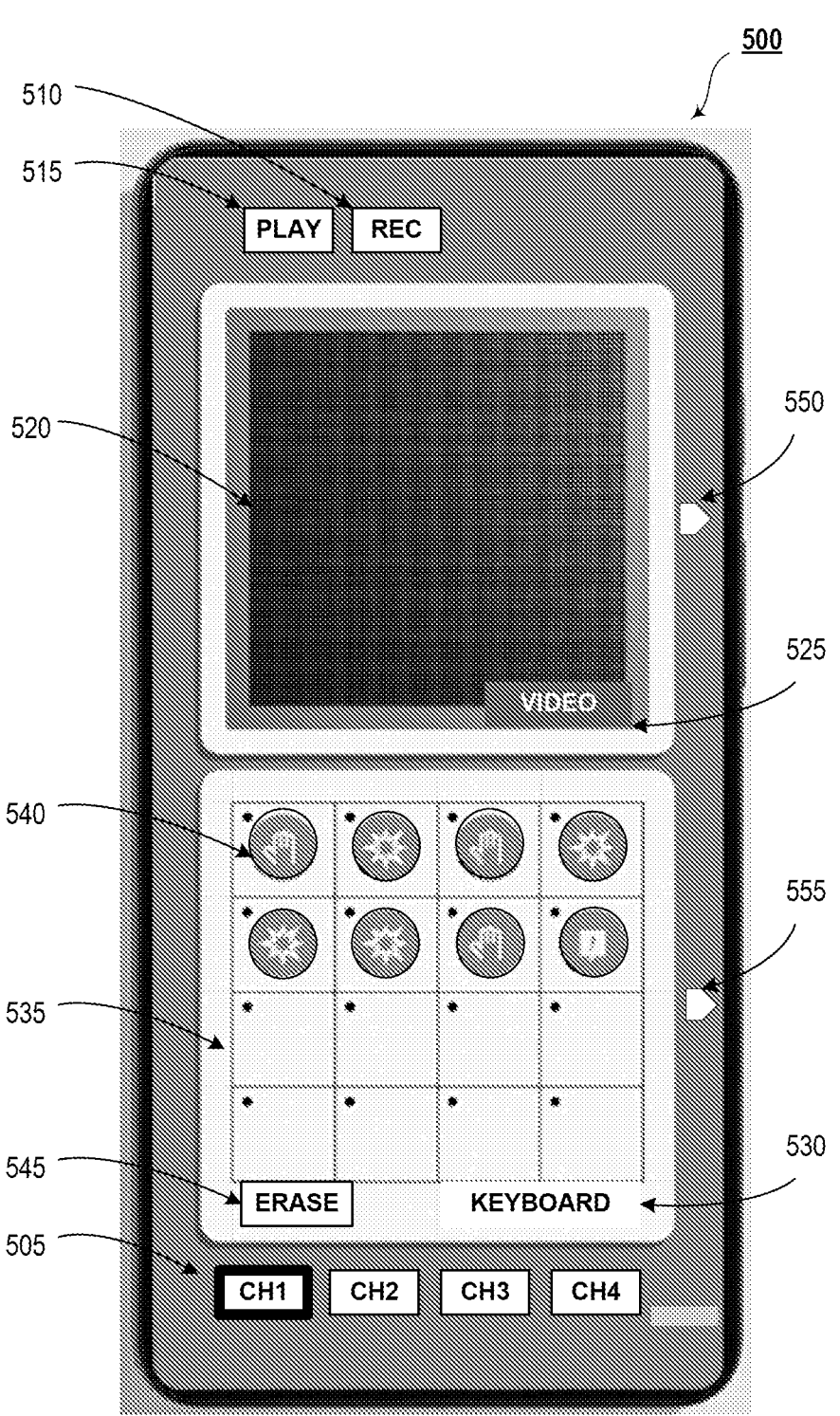
FIG. 5 illustrates an example control interface, in accordance with example embodiments.

FIG. 5 illustrates an example control interface 500, in accordance with example embodiments. In some embodiments, the control interface can include a plurality of selectable tabs corresponding to a plurality of audio channels, where user selection of a tab of the plurality of selectable tabs enables user access to one or more channel interfaces to interact with one or more of an audio clip or a video clip in the audio channel corresponding to the user selected tab. Control interface 500 includes selectable tabs for one or more such audio channels. For example, a first audio channel CH1 505 may be associated with first initial content (e.g., initial content 205). Additional selectable tabs, second audio channel CH2, third audio channel CH3, fourth audio channel CH4, and so forth, may be associated with additional initial content. As illustrated, a selectable tab for first audio channel CH1 505 is displayed as having been selected. Upon selection of the selectable tab, control interface 500 displays various tabs, icons and/or features to enable a user-generated sequence of audio clips, as for example, described with reference to FIG. 3. For example, a record tab "REC" 510 allows a user to record a new audiovisual content. A play tab "PLAY" 515 allows a user to play the new audiovisual content. A display screen 520 of a top channel interface, video channel interface 525, of control interface 500 can display the new audiovisual content.

In some embodiments, the one or more channel interfaces comprises an interface with one or more icons corresponding to the one or more identified audio clips. The user-generated sequence of audio clips is based on user indication of selecting at least one icon of the one or more icons to generate the sequence. A bottom channel interface, keyboard channel interface 530, of control interface 500 can be provided to enable user generation of a sequence of audio clips. Keyboard channel interface 530 may include an array 535 of selectable keys. For example, a first key 540 may correspond to a first audio clip, a second key may correspond to a second audio clip, and so forth. As a user taps the keys in succession, controller 170 generates a sequence of audio clips corresponding to the sequence of tapped keys.

In some embodiments, the one or more identified audio clips can include a plurality of percussive sounds comprising an initial rhythm, and controller 170 can generate a plurality of modified versions of the plurality of percussive sounds. The plurality of modified versions can be associated with a modified rhythm different from the initial rhythm. In some embodiments, controller 170 can provide the plurality of modified versions of the plurality of percussive sounds via keys of keyboard channel interface 530. The user-generated sequence of audio clips can be based on the plurality of modified versions of the plurality of percussive sounds. For example, as a user taps the keys of keyboard channel interface 530 in succession, controller 170 generates a sequence of audio clips corresponding to the sequence of tapped keys.

An erase tab "ERASE" 545 allows the user to erase one or more taps, thereby erasing the corresponding audio clips from the sequence. Forward arrow tab 550 enables the user to toggle (e.g., by swiping left) between video channel interface 525 and other available channel interfaces of the control interface (e.g., pattern channel interface 635 of FIG. 6, mixer channel interface 720 of FIG. 7, master channel interface 820 of FIG. 8, and so forth). Likewise, forward arrow tab 555 enables the user to toggle (e.g., by swiping left) between keyboard channel interface 530 and other available channel interfaces of the control interface (e.g., keyboard channel interface 645 of FIG. 6, keyboard channel interface 765 of FIG. 7, function channel interface 840 of FIG. 8, and so forth).

Figure 6:
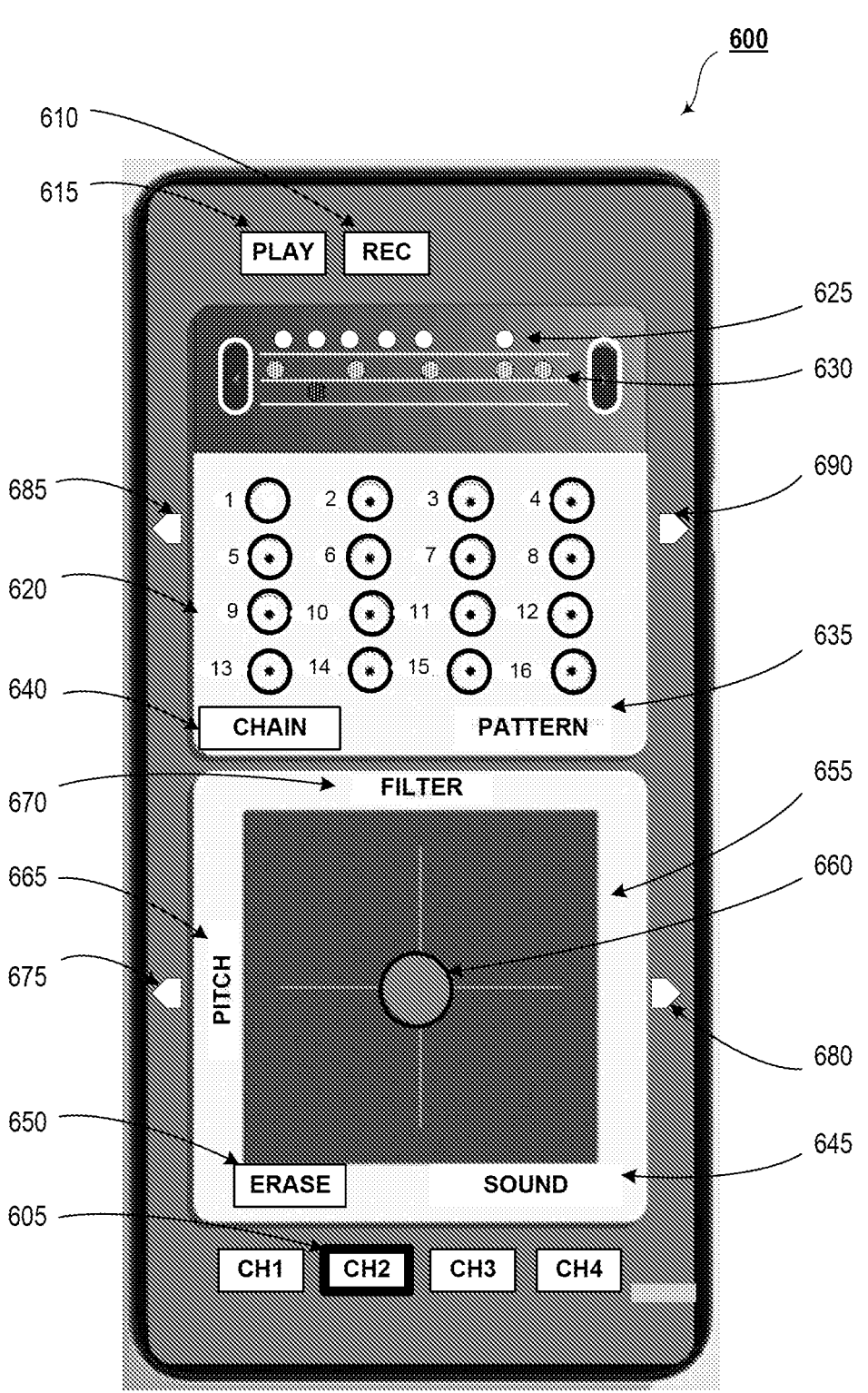
FIG. 6 illustrates another example control interface, in accordance with example embodiments.

FIG. 6 illustrates another example control interface 600, in accordance with example embodiments. Control interface 600 includes selectable tabs for one or more audio channels. For example, second audio channel CH2 605 may be associated with second initial content (e.g., different from initial content 205). Additional selectable tabs, first audio channel CH1, third audio channel CH3, fourth audio channel CH4, and so forth, may be associated with additional initial content. As illustrated, a selectable tab for second audio channel CH2 605 is displayed as having been selected. Upon selection of the selectable tab, control interface 600 displays various tabs, icons and/or features to enable a user-generated sequence of audio clips, as for example, described with reference to FIG. 3. For example, a record tab "REC" 610 allows a user to record a new audiovisual content. A play tab "PLAY" 615 allows a user to play the new audiovisual content.

In some embodiments, the one or more channel interfaces can include an interface displaying a plurality of user-generated sequences, each sequence of the plurality of user-generated sequences corresponding to the plurality of audio channels, and further comprising a selectable option enabling a user to chain the one or more sequences to generate a new sequence. For example, a top channel interface, pattern channel interface 635, of control interface 600 enables a user to generate patterns based on one or more generated sequences. An array 620 of selectable numbered icons can enable a user to select a sequence of sequences (e.g., third sequence 415 of FIG. 4). For example, selectable icons labeled "1" through "16" of array 620 are displayed for illustrative purposes. Each such icon of array 620 may be associated with a generated sequence. A user may select one or more sequences, and a schematic representation of the sequence may be displayed, with a corresponding spacing for beats. For example, a first schematic representation for a first sequence 625 (e.g., corresponding to first audio channel CH1 505 of FIG. 5), a second schematic representation for a second sequence 630 (e.g., corresponding to second audio channel CH2 605), and so forth, may be displayed in pattern channel interface 635. A selectable tab "CHAIN" 640 can enable a user to chain first sequence 625, second sequence 630, and so forth, to form new audio sequences.

In some embodiments, the one or more channel interfaces can include an interface displaying a plurality of user-generated sequences, each sequence of the plurality of user-generated sequences corresponding to the plurality of audio channels, and further including a selectable option enabling a user to mix the one or more sequences to generate a new audio track. For example, pattern channel interface 635 can be configured to enable user-generated patterns by enabling mixing of the one or more identified audio clips corresponding to first audio channel CH1 505, second audio channel CH2 605, and so forth.

A bottom channel interface, sound channel interface 645, of control interface 600 can be provided to enable a user to modify audio characteristics of the audio sequences. Sound channel interface 645 may include an erase tab "ERASE" 650 to enable a user to erase one or more edits performed to modify the audio characteristics of the audio sequences. In some embodiments, the one or more channel interfaces can include an interface displaying a pair of coordinate axes, where a horizontal axis corresponds to a plurality of pitch adjustments for the user-generated sequence, and a vertical axis corresponds to a plurality of simultaneously adjustable audio filter adjustments for the user-generated sequence. For example, a display 655 may display the pair of coordinate axes with a user-adjustable icon 660. Moving user-adjustable icon 660 along the horizontal axis can cause pitch adjustments 665 to be applied to the user-generated sequence (e.g., the pitch increases as user-adjustable icon 660 moves from left to right along the horizontal axis). Moving user-adjustable icon 660 along the vertical axis can cause filter adjustments 670 to be applied to the user-generated sequence (e.g., the filter opens up as user-adjustable icon 660 moves from bottom to top along the vertical axis). The term "filter" as used herein generally refers to an amplifier circuit based on frequencies. For example, the filter can be a low-pass filter, a high-pass filter, an all-pass filter, a bandpass filter, and so forth.

Backward arrow tab 675 enables the user to toggle (e.g., by swiping right) between sound channel interface 645 and other available channel interfaces of the control interface (e.g., keyboard channel interface 530 of FIG. 5). Likewise, forward arrow tab 680 enables the user to toggle (e.g., by swiping left) between sound channel interface 645 and other available channel interfaces of the control interface (e.g., keyboard channel interface 765 of FIG. 7, function channel interface 840 of FIG. 8, and so forth).

Backward arrow tab 685 enables the user to toggle (e.g., by swiping right) between pattern channel interface 635 and other available channel interfaces of the control interface (e.g., video channel interface 525 of FIG. 5). Likewise, forward arrow tab 680 enables the user to toggle (e.g., by swiping left) between pattern channel interface 635 and other available channel interfaces of the control interface (e.g., mixer channel interface 720 of FIG. 7, master channel interface 820 of FIG. 8, and so forth).

Figure 7:
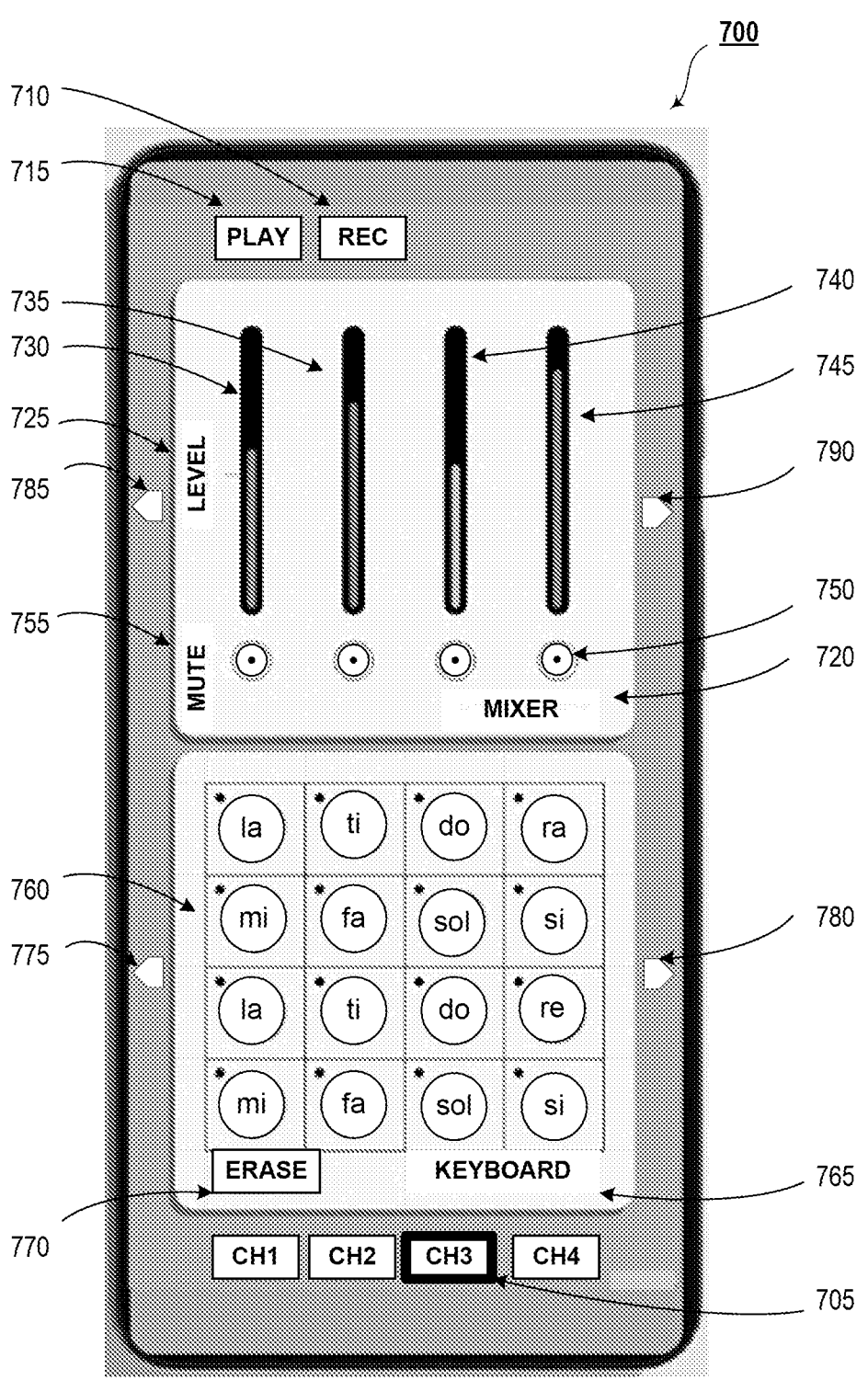
FIG. 7 illustrates another example control interface, in accordance with example embodiments.

FIG. 7 illustrates another example control interface 700, in accordance with example embodiments. Control interface 700 includes selectable tabs for one or more audio channels. For example, a third audio channel CH3 705 may be associated with another initial content (e.g., different from initial content 205). Additional selectable tabs, first audio channel CH1, second audio channel CH2, fourth audio channel CH4, and so forth, may be associated with additional initial content. As illustrated, a selectable tab for third audio channel CH3 705 is displayed as having been selected. Upon selection of the selectable tab, control interface 700 displays various tabs, icons and/or features to enable a user-generated sequence of audio clips, as for example, described with reference to FIG. 3. For example, a record tab "REC" 710 allows a user to record a new audiovisual content. A play tab "PLAY" 715 allows a user to play the new audiovisual content.

In some embodiments, the one or more channel interfaces can include an interface displaying a plurality of respective volume controls for the plurality of audio channels. The plurality of respective volume controls can enable a user to simultaneously control volume settings of each of the plurality of audio channels. For example, top channel interface, mixer channel interface 720, of control interface 700 can be provided to enable a user to simultaneously adjust volume level 725 for audio channels CH1, CH2, CH3, and CH4. For example, first volume control 730 can be configured to adjust volume settings for a first generated sequence corresponding to first audio channel CH1, second volume control 735 can be configured to adjust volume settings for a second generated sequence corresponding to second audio channel CH2, third volume control 740 can be configured to adjust volume settings for a third generated sequence corresponding to third audio channel CH3, and fourth volume control 745 can be configured to adjust volume settings for a fourth generated sequence corresponding to fourth audio channel CH4. Each volume control can be associated with respective muting icons 750 that enable the user to mute 755 the corresponding audio channel. For example, user selection of a muting icon displayed below first volume control 730 can mute the audio for the first generated sequence corresponding to the first audio channel CH1, and so forth.

A bottom channel interface, keyboard channel interface 765, of control interface 700 can be provided to enable a user to repitch a musical note in an audio clip to another note. Keyboard channel interface 765 may include an erase tab "ERASE" 770 to enable a user to erase one or more edits performed to repitch the musical note. In some embodiments, the one or more channel interfaces can include an interface with one or more icons corresponding to the plurality of repitched versions of a musical note. For example, keyboard channel interface 765 enables a user to generate one or more sequences based on repitched versions of the musical note. An array 760 of selectable labeled icons can enable a user to select the sequence of repitched versions of the musical note. Each such icon of array 760 may be associated with a different note. For example, selectable icons labeled "do," "re," "mi," "fa," "sol," "la," and "ti," of array 760 are displayed for illustrative purposes. A user may select one or more selectable icons of array 760 in succession, and controller 170 can generate a sequence (e.g., first sequence 405 of FIG. 4) based on corresponding repitched versions of the musical note.

Backward arrow tab 775 enables the user to toggle (e.g., by swiping right) between keyboard channel interface 765 and other available channel interfaces of the control interface (e.g., keyboard channel interface 530 of FIG. 5, sound channel interface 645 of FIG. 6, and so forth). Likewise, forward arrow tab 780 enables the user to toggle (e.g., by swiping left) between keyboard channel interface 765 and other available channel interfaces of the control interface (e.g., function channel interface 840 of FIG. 8, and so forth).

Backward arrow tab 785 enables the user to toggle (e.g., by swiping right) between mixer channel interface 720 and other available channel interfaces of the control interface (e.g., video channel interface 525 of FIG. 5, pattern channel interface 635 of FIG. 6, and so forth). Likewise, forward arrow tab 790 enables the user to toggle (e.g., by swiping left) between mixer channel interface 720 and other available channel interfaces of the control interface (e.g., master channel interface 820 of FIG. 8, and so forth).

Figure 8:
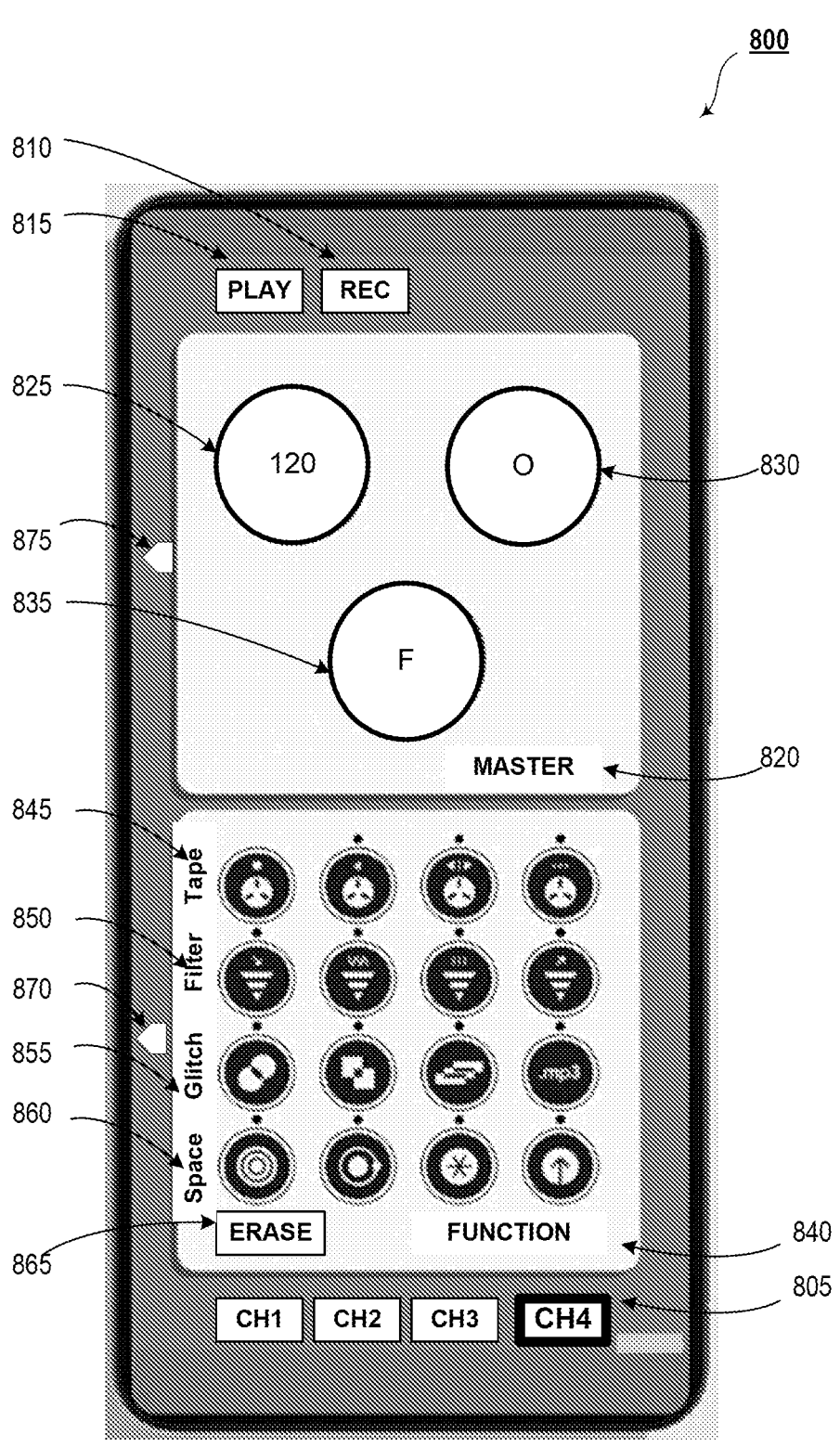
FIG. 8 illustrates another example control interface, in accordance with example embodiments.

FIG. 8 illustrates another example control interface 800, in accordance with example embodiments. Control interface 800 includes selectable tabs for one or more audio channels. For example, a fourth audio channel CH4 805 may be associated with another initial content. Additional selectable tabs, first audio channel CH1, second audio channel CH2, third audio channel CH3, and so forth, may be associated with additional initial content. As illustrated, a selectable tab for fourth audio channel CH4 805 is displayed as having been selected. Upon selection of the selectable tab, control interface 800 displays various tabs, icons, and/or features to enable a user-generated sequence of audio clips, as for example, described with reference to FIG. 3. For example, a record tab "REC" 810 allows a user to record a new audiovisual content. A play tab "PLAY" 815 allows a user to play the new audiovisual content.

In some embodiments, the one or more channel interfaces can include an interface displaying a first tool to adjust a tempo, a second tool to adjust a swing, and a third tool to adjust a root musical note, for an audio clip in the sequence of audio clips. For example, top channel interface, master channel interface 820, of control interface 800 can be provided. Master channel interface 820 can include first tool 825 to adjust a tempo, second tool 830 to adjust a swing, and third tool 835 to adjust a root musical note. For example, tempo can be measured as beats per minute (BPM). As illustrated, first tool 825 displays "120" indicating that a sequence of percussive sounds is being played at 120 BPM. The term "swing" refers to techniques of adjusting rhythm that alternates between lengthening and shortening the first and second consecutive notes in two-part pulse divisions in a beat. In some embodiments, the first note may be twice as long as the second note. Also, for example, a swing rhythm may involve swung eighth notes, where the notes are performed as uneven eighth notes in a quasi-triplet rhythm. Additional, and/or alternative swing rhythms may be applied to a generated sequence. The root musical note may be a setting for a musical scale, such as, for example, minor, major, and/or flat versions of scales A, B, C, D, E, F, and G.

In some embodiments, the one or more channel interfaces can include an interface displaying a plurality of video edit icons. User selection of a video edit icon of the plurality of video edit icons enables application of a video edit feature to a video clip of the sequence of video clips. For example, a bottom channel interface, function channel interface 840, of control interface 800 can be provided to enable a user to apply a video edit feature to a video clip of the sequence of video clips. Function channel interface 840 can include selectable icons corresponding to each audio channel CH1, CH2, CH3, and CH4. For example, first audio channel CH1 may be associated with selectable icons displayed directly above it. A first selectable icon 845 may be configured to adjust a tape, a second selectable icon 850 may be configured to adjust a filter, a third selectable icon 855 may be configured to adjust a glitch, and a fourth selectable icon 860 may be configured to adjust a space. Similar adjustable icons may be provided for each audio channel, and may, in one example arrangement, be displayed vertically above the selectable icon for the respective audio channel. Function channel interface 840 may include an erase tab "ERASE" 865 to enable a user to erase one or more video edit features applied to a video clip.

Backward arrow tab 870 enables the user to toggle (e.g., by swiping right) between function channel interface 840 and other available channel interfaces of the control interface (e.g., keyboard channel interface 530 of FIG. 5, sound channel interface 645 of FIG. 6, keyboard channel interface 765 of FIG. 7, and so forth). Likewise, backward arrow tab 875 enables the user to toggle (e.g., by swiping right) between master channel interface 820 and other available channel interfaces of the control interface (e.g., video channel interface 525 of FIG. 5, pattern channel interface 635 of FIG. 6, mixer channel interface 720 of FIG. 7, and so forth).

Generally, the one or more channel interfaces described herein (e.g., keyboard channel interface 530 of FIG. 5, sound channel interface 645 of FIG. 6, keyboard channel interface 765 of FIG. 7, function channel interface 840 of FIG. 8, video channel interface 525 of FIG. 5, pattern channel interface 635 of FIG. 6, mixer channel interface 720 of FIG. 7, master channel interface 820 of FIG. 8, and so forth) can be available for each of the audio channels (e.g., first audio channel CH1, second audio channel CH2, third audio channel CH3, fourth audio channel CH4, and so forth). Additional, and/or alternative channel interfaces can be configured to provide further editing capabilities to a user.

In some embodiments, the new audiovisual content may be provided via the computing device (e.g., computing device 100). In some embodiments, the providing of the new audiovisual content can include providing user selectable virtual tabs to enable automatic upload of the new audiovisual content to a social networking site, and/or sharing of the new audiovisual content with other users. For example, selectable icons representing one or more media upload sites may be provided, and control interface (e.g., one or more control interface(s) 162) may enable a user to directly upload the new audiovisual content to the one or more media upload sites by selecting a respective selectable icon.

V. Example Network Environment

Figure 9:
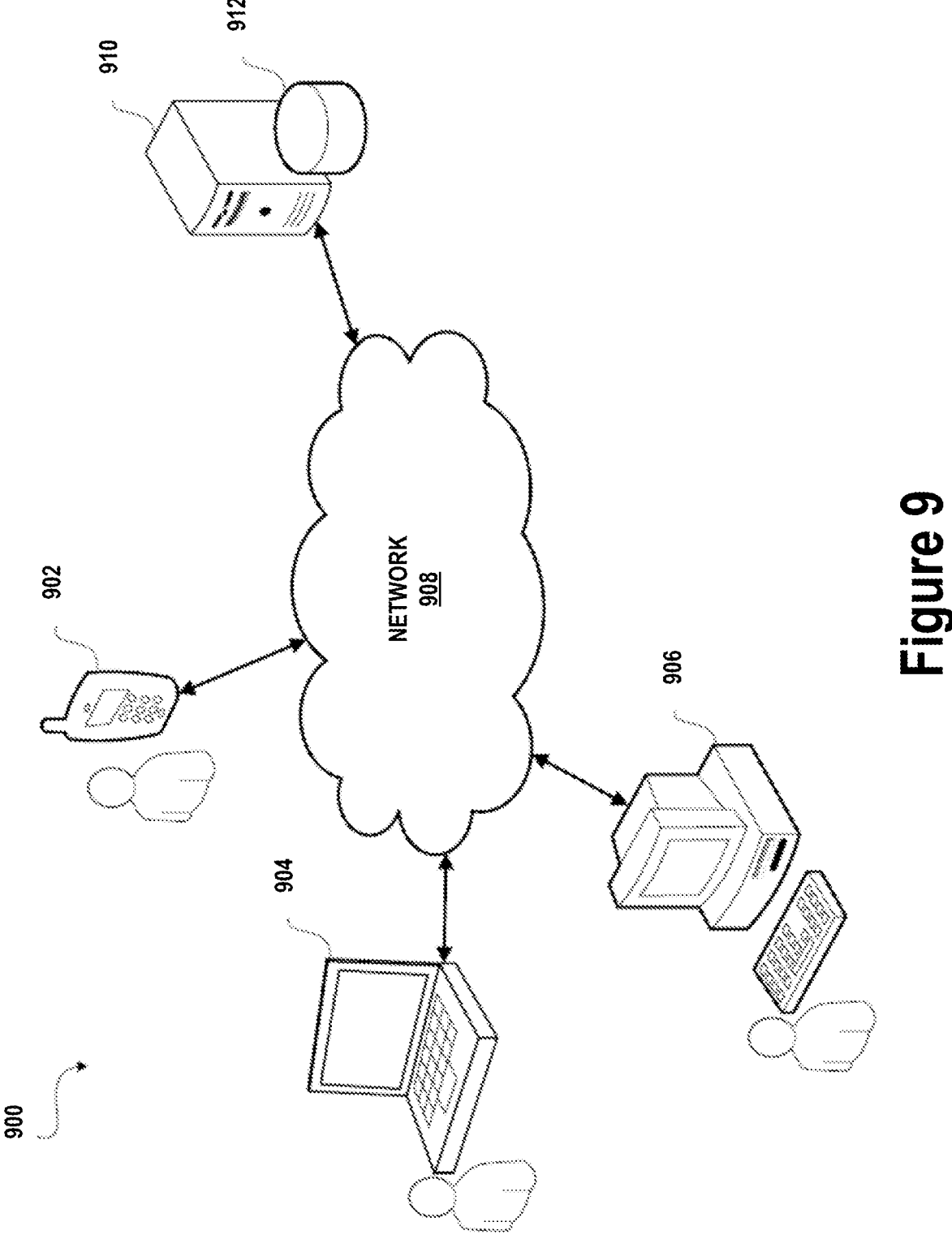
FIG. 9 illustrates an example network environment for creation of audiovisual content, in accordance with example embodiments.

FIG. 9 illustrates example network environment 900 for creation of audiovisual content, in accordance with example embodiments. The network environment 900 includes computing devices 902, 904, and 906, server 910, and storage 912. In some aspects, the network environment 900 can have more or fewer computing devices (e.g., 902-906) and/or server (e.g., 910) than those shown in FIG. 9.

Each of the computing devices 902, 904, and 906 can represent various forms of processing devices that have a processor, a memory, and communications capability. The computing devices 902, 904, and 906 may communicate with each other, with the server 910, and/or with other systems and devices not shown in FIG. 9. By way of non-limiting example, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, a wired/wireless headphone/headset, a wearable device, a wireless or wired speaker(s), or a combination of any of these processing devices or other processing devices.

Each of the computing devices 902, 904, and 906 may be configured with built-in control interfaces and/or audio processing architecture for achieving desirable audio signal processing effects. For example, an application comprising one or more control interfaces may be installed on the computing devices 902, 904, and 906 as a client application. The computing devices 902, 904, and 906 may be associated with a single user. Captured media content, and/or new audiovisual content may be transmitted to and received from server 910 via network 908. Also, for example, each of the computing devices 902, 904, and 906 may include one or more microphones, one or more speakers, one or more sensors (e.g., an accelerometer, a gyroscope), a transducer, and so forth.

The network 908 can be a computer network such as, for example, a local area network (LAN), wide area network (WAN), the Internet, a cellular network, or a combination thereof connecting any number of mobile clients, fixed clients, and servers. Further, the network 908 can include, but is not limited to, any one or more of the following network topologies, including a bus network, a star network, a ring network, a mesh network, a star-bus network, tree or hierarchical network, and the like. In some aspects, communication between each client (e.g., computing devices 902, 904, and 906) and server (e.g., server 910) can occur via a virtual private network (VPN), Secure Shell (SSH) tunnel, Secure Socket Layer (SSL) communication, or other secure network connection. In some aspects, network 908 may further include a corporate network (e.g., intranet) and one or more wireless access points.

Server 910 may represent a single computing device such as a computer server that includes a processor and a memory. The processor may execute computer instructions stored in memory. The server 910 is configured to communicate with client applications (e.g., applications) on client devices (e.g., the computing devices 902, 904, and 906) via the network 908. For example, the server 910 may transmit the new audiovisual content from the computing device 902 to the computing device 906 when the user switches the device from the computing device 902 to the computing device 906. In one or more implementations, the computing device 902, the computing device 904, the computing device 906, or the server 910 may be, or may include all or part of, computing device 100 components that are discussed with respect to FIG. 1.

VI. Training Machine Learning Methods for Generating Inferences/Predictions

Figure 10:
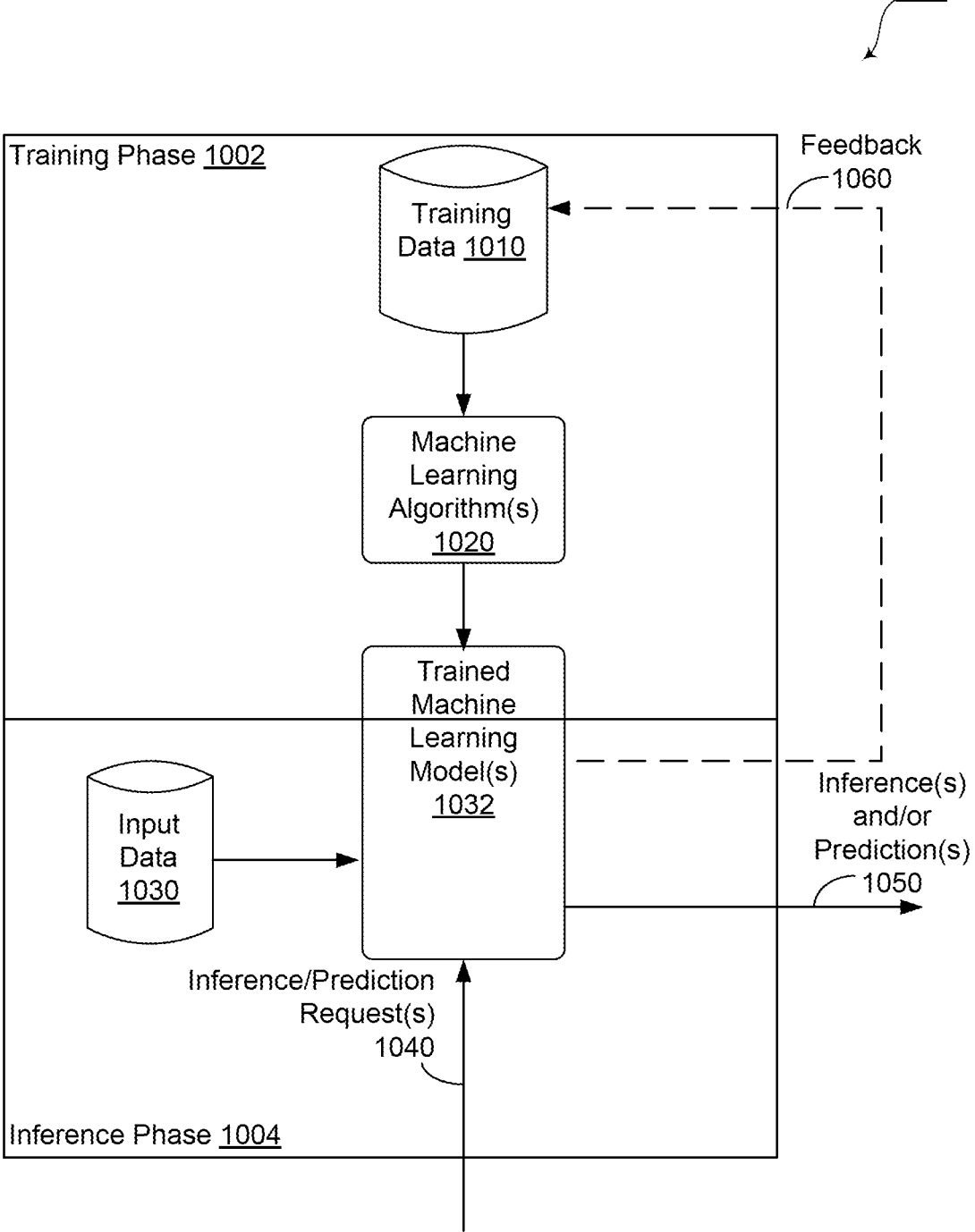
FIG. 10 is a diagram illustrating a training phase and an inference phase of a machine learning model, in accordance with example embodiments.

FIG. 10 shows diagram 1000 illustrating a training phase 1002 and an inference phase 1004 of trained machine learning model(s) 1032, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 10 shows training phase 1002 where one or more machine learning algorithms 1020 are being trained on training data 1010 to become trained machine learning model 1032. Then, during inference phase 1004, trained machine learning model 1032 can receive input data 1030 and one or more inference/prediction requests 1040 (perhaps as part of input data 1030) and responsively provide as an output one or more inferences and/or predictions 1050.

As such, trained machine learning model(s) 1032 can include one or more models of one or more machine learning algorithms 1020. Machine learning algorithm(s) 1020 may include, but are not limited to: an artificial neural network (e.g., convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 1020 may be supervised or unsupervised, and may implement any suitable combination of online and offline learning.

In some examples, machine learning algorithm(s) 1020 and/or trained machine learning model(s) 1032 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 1020 and/or trained machine learning model(s) 1032. In some examples, trained machine learning model(s) 1032 can be trained, resident, and executed to provide inferences on a particular computing device, and/or otherwise can make inferences for the particular computing device.

During training phase 1002, machine learning algorithm(s) 1020 can be trained by providing at least training data 1010 as training input using unsupervised, supervised, semi-supervised, and/or reinforcement learning techniques. Training data 1010 can include a collection of videos comprising audio tracks. The videos may be labeled to identify transient points, audio clips of interest, corresponding video clips (with a starting point possibly offset from the transient point), and so forth. Unsupervised learning involves providing a portion (or all) of training data 1010 to machine learning algorithm(s) 1020 and machine learning algorithm(s) 1020 determining one or more output inferences based on the provided portion (or all) of training data 1010. Supervised learning involves providing a portion of training data 1010 to machine learning algorithm(s) 1020, with machine learning algorithm(s) 1020 determining one or more output inferences based on the provided portion of training data 1010, and the output inference(s) are either accepted or corrected based on correct results associated with training data 1010. In some examples, supervised learning of machine learning algorithm(s) 1020 can be governed by a set of rules and/or a set of labels for the training input, and the set of rules and/or set of labels may be used to correct inferences of machine learning algorithm(s) 1020.

Semi-supervised learning involves having correct results for part, but not all, of training data 1010. During semi-supervised learning, supervised learning is used for a portion of training data 1010 having correct results, and unsupervised learning is used for a portion of training data 1010 not having correct results. Reinforcement learning involves machine learning algorithm(s) 1020 receiving a reward signal regarding a prior inference, where the reward signal can be a numerical value. During reinforcement learning, machine learning algorithm(s) 1020 can output an inference and receive a reward signal in response, where machine learning algorithm(s) 1020 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1020 and/or trained machine learning model(s) 1032 can be trained using other machine learning techniques, including but not limited to, incremental learning and curriculum learning.

In some examples, machine learning algorithm(s) 1020 and/or trained machine learning model(s) 1032 can use transfer learning techniques. For example, transfer learning techniques can involve trained machine learning model(s) 1032 being pre-trained on one set of data and additionally trained using training data 1010. More particularly, machine learning algorithm(s) 1020 can be pre-trained on data from one or more computing devices and a resulting trained machine learning model provided to a particular computing device, where the particular computing device is intended to execute the trained machine learning model during inference phase 1004. Then, during training phase 1002, the pre-trained machine learning model can be additionally trained using training data 1010, where training data 1010 can be derived from kernel and non-kernel data of the particular computing device. This further training of the machine learning algorithm(s) 1020 and/or the pre-trained machine learning model using training data 1010 of the particular computing device's data can be performed using either supervised or unsupervised learning. Once machine learning algorithm(s) 1020 and/or the pre-trained machine learning model has been trained on at least training data 1010, training phase 1002 can be completed. The trained resulting machine learning model can be utilized as at least one of trained machine learning model(s) 1032.

In particular, once training phase 1002 has been completed, trained machine learning model(s) 1032 can be provided to a computing device, if not already on the computing device. Inference phase 1004 can begin after trained machine learning model(s) 1032 are provided to the particular computing device.

During inference phase 1004, trained machine learning model(s) 1032 can receive input data 1030 and generate and output one or more corresponding inferences and/or predictions 1050 about input data 1030. As such, input data 1030 can be used as an input to trained machine learning model(s) 1032 for providing corresponding inference(s) and/or prediction(s) 1050 to kernel components and non-kernel components. For example, trained machine learning model(s) 1032 can generate inference(s) and/or prediction(s) 1050 in response to one or more inference/prediction requests 1040. In some examples, trained machine learning model(s) 1032 can be executed by a portion of other software. For example, trained machine learning model(s) 1032 can be executed by an inference or prediction daemon to be readily available to provide inferences and/or predictions upon request. Input data 1030 can include data from the particular computing device executing trained machine learning model(s) 1032 and/or input data from one or more computing devices other than the particular computing device.

Input data 1030 can include an initial content (e.g., initial content 205) and/or audio track (e.g., audio track 210) corresponding to the initial content (e.g., initial content 205).

Inference(s) and/or prediction(s) 1050 can include output transient points (e.g., transient points $T_1$, $T_2$, $T_3$ of FIG. 2), audio clips (e.g., audio clips $A_1$, $A_2$, $A_3$ of FIG. 2), and/or corresponding video clips (e.g., video clips $V_1$, $V_2$, $V_3$ of FIG. 2), and/or other output data produced by trained machine learning model(s) 1032 operating on input data 1030 (and training data 1010). In some examples, trained machine learning model(s) 1032 can use output inference(s) and/or prediction(s) 1050 as input feedback 1060. Trained machine learning model(s) 1032 can also rely on past inferences as inputs for generating new inferences.

In some examples, a single computing device ("CD_SOLO") can include the trained version of the machine learning model, perhaps after training the machine learning model. Then, computing device CD_SOLO can receive requests to identify transient points, identify one or more audio clips, and/or extract corresponding video clips from input audiovisual content, and use the trained version of machine learning model to identify the transient points, identify the one or more audio clips, and/or extract the corresponding video clips.

In some examples, two or more computing devices, such as a first client device ("CD_CLI") and a server device ("CD_SRV") can be used to provide the output; e.g., a first computing device CD_CLI can generate and send requests to identify transient points, identify one or more audio clips, and/or extract corresponding video clips from input audiovisual content to a second computing device CD_SRV. Then, CD_SRV can use the trained version of the machine learning model, to identify the transient points, identify the one or more audio clips, and/or extract the corresponding video clips. Then, upon reception of responses to the requests, CD_CLI can provide the requested output via one or more control interfaces (e.g., control interface(s) 162).

VII. Example Methods of Operation

Figure 11:
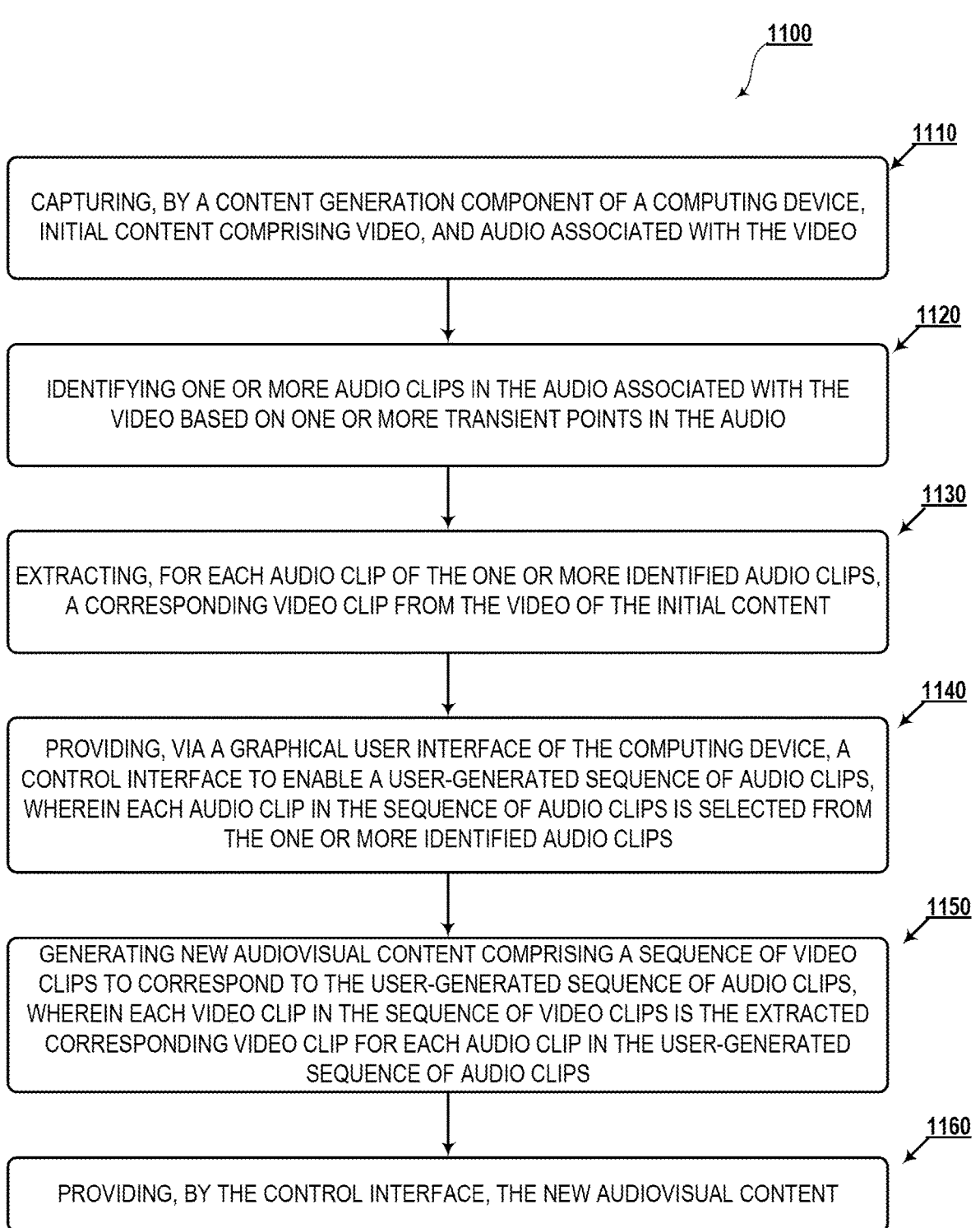
FIG. 11 illustrates a flow chart, in accordance with example embodiments.

FIG. 11 illustrates flow chart 1100 of operations related to using audio processing stages provided by an operating system. The operations may be executed by and/or used with any of computing devices 100, 902-906, or other ones of the preceding example embodiments.

Block 1110 involves capturing, by a content generation component of a computing device, initial content comprising video, and audio associated with the video.

Block 1120 involves identifying one or more audio clips in the audio associated with the video based on one or more transient points in the audio.

Block 1130 involves extracting, for each audio clip of the one or more identified audio clips, a corresponding video clip from the video of the initial content.

Block 1140 involves providing, via a graphical user interface of the computing device, a control interface to enable a user-generated sequence of audio clips, wherein each audio clip in the sequence of audio clips is selected from the one or more identified audio clips.

Block 1150 involves generating new audiovisual content comprising a sequence of video clips to correspond to the user-generated sequence of audio clips, wherein each video clip in the sequence of video clips is the extracted corresponding video clip for each audio clip in the user-generated sequence of audio clips.

Block 1160 involves providing, by the control interface, the new audiovisual content.

In some embodiments, the one or more identified audio clips include a plurality of percussive sounds comprising an initial rhythm. Such embodiments involve generating a plurality of modified versions of the plurality of percussive sounds, wherein the plurality of modified versions is associated with a modified rhythm different from the initial rhythm. Such embodiments also involve providing, via the control interface, the plurality of modified versions of the plurality of percussive sounds. The user-generated sequence of audio clips can be based on the plurality of modified versions of the plurality of percussive sounds.

In some embodiments, the control interface includes a plurality of selectable tabs corresponding to a plurality of audio channels. User selection of a tab of the plurality of selectable tabs can enable user access to one or more channel interfaces to interact with one or more of an audio clip or a video clip in the audio channel corresponding to the user selected tab.

In some embodiments, the plurality of audio channels include audio clips corresponding to one or more of a melodic note, a percussive sound, a musical composition, an instrumental sound, a silence, or a vocal phrase.

In some embodiments, each audio channel of the plurality of audio channels can be associated with a given audiovisual content different from the initial content.

In some embodiments, the one or more channel interfaces include an interface with one or more icons corresponding to the one or more identified audio clips. The user-generated sequence of audio clips can be based on user indication of selecting at least one icon of the one or more icons to generate the sequence.

In some embodiments, an audio clip of the one or more identified audio clips comprises a musical note. Such embodiments involve generating a plurality of repitched versions of the musical note. The one or more channel interfaces can include an interface with one or more icons corresponding to the plurality of repitched versions of the musical note. The user-generated sequence of audio clips can be based on user indication of selecting at least one icon of the one or more icons to generate the sequence.

In some embodiments, the one or more channel interfaces include an interface displaying a plurality of user-generated sequences, each sequence of the plurality of user-generated sequences corresponding to the plurality of audio channels, and further including a selectable option enabling a user to chain the one or more sequences to generate a new sequence.

In some embodiments, the one or more channel interfaces include an interface displaying a plurality of user-generated sequences, each sequence of the plurality of user-generated sequences corresponding to the plurality of audio channels, and further including a selectable option enabling a user to mix the one or more sequences to generate a new audio track.

In some embodiments, the one or more channel interfaces include an interface displaying a pair of coordinate axes. A horizontal axis can correspond to a plurality of pitch adjustments for the user-generated sequence, and a vertical axis can correspond to a plurality of simultaneously adjustable audio filter adjustments for the user-generated sequence.

In some embodiments, the one or more channel interfaces include an interface displaying a plurality of respective volume controls for the plurality of audio channels. The plurality of respective volume controls can enable a user to simultaneously control volume settings of each of the plurality of audio channels.

In some embodiments, the one or more channel interfaces include an interface displaying a first tool to adjust a tempo, a second tool to adjust a swing, and a third tool to adjust a root musical note, for an audio clip in the sequence of audio clips.

In some embodiments, the one or more channel interfaces include an interface displaying a plurality of video edit icons. User selection of a video edit icon of the plurality of video edit icons can enable application of a video edit feature to a video clip of the sequence of video clips.

Some embodiments involve identifying one or more second audio clips in a second initial content based on one or more second transient points in the second initial content. These embodiments also involve enabling, via the control interface, a second user-generated sequence of second audio clips, wherein each second audio clip in the sequence of second audio clips is selected from the one or more identified second audio clips. The generating of the new audiovisual content includes generating a second sequence of video clips to correspond to the user-generated sequence of audio clips and the user-generated sequence of second audio clips.

In some embodiments, the computing device can include an image capture device. The initial content can be captured by the image capture device.

In some embodiments, the transient points in the initial content include one or more of a transient location, a pause, or a cut.

In some embodiments, the identifying of the one or more audio clips in the initial content involves identifying, in a soundtrack of the initial content, one or more of a melodic note, a percussive sound, a musical composition, an instrumental sound, a change in audio intensity, a silence, or a vocal phrase.

In some embodiments, the identifying of the one or more audio clips in the initial content can be performed by a trained machine learning model. Some of these embodiments involve identifying, by the trained machine learning model, a classification for an audio clip of the one or more audio clips. Such embodiments further involve generating, based on the classification, a visual label associated with the audio clip. These embodiments also involve displaying, via the control interface, the visual label on a selectable icon corresponding to the audio clip.

Some embodiments involve providing the new audiovisual content via the computing device. In such embodiments, the providing of the new audiovisual content can involve providing user selectable virtual tabs to enable automatic upload of the new audiovisual content to a social networking site.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A computing device, comprising:

a graphical user interface configured to enable generation of audiovisual content;

one or more processors; and data storage, wherein the data storage has stored thereon computer-executable instructions that, when executed by the one or more processors, cause the computing device to carry out functions comprising:

capturing, by a content generation component of the computing device, initial content comprising co-captured video, and co-captured audio associated with the video;

identifying one or more audio clips in the audio associated with the video based on one or more transient points in the audio;

extracting, for each audio clip of the one or more identified audio clips, a corresponding video clip from the video of the initial content;

providing, via the graphical user interface, a control interface to enable a user-generated sequence of audio clips, wherein each audio clip in the sequence of audio clips is selected from the one or more identified audio clips, and wherein the control interface comprises a plurality of selectable tabs corresponding to a plurality of audio channels, wherein user selection of a tab of the plurality of selectable tabs enables user access to one or more channel interfaces to interact with one or more of an audio clip or a video clip in the audio channel corresponding to the user selected tab;

generating new audiovisual content comprising a sequence of video clips to correspond to the user-generated sequence of audio clips, wherein each video clip in the sequence of video clips is the extracted corresponding video clip for each audio clip in the user-generated sequence of audio clips; and providing, by the control interface, the new audiovisual content.

2. The computing device of claim 1, wherein the one or more identified audio clips comprise a plurality of percussive sounds comprising an initial rhythm, and wherein the providing of the control interface further comprises:

generating a plurality of modified versions of the plurality of percussive sounds, wherein the plurality of modified versions is associated with a modified rhythm different from the initial rhythm; and providing, via the control interface, the plurality of modified versions of the plurality of percussive sounds, wherein the user-generated sequence of audio clips is based on the plurality of modified versions of the plurality of percussive sounds.

3. The computing device of claim 1, wherein the plurality of audio channels comprise audio clips corresponding to one or more of a melodic note, a percussive sound, a musical composition, an instrumental sound, a silence, or a vocal phrase.

4. The computing device of claim 1, wherein each audio channel of the plurality of audio channels is associated with a given audiovisual content different from the initial content.

5. The computing device of claim 1, wherein the one or more channel interfaces comprises an interface with one or more icons corresponding to the one or more identified audio clips, and wherein the user-generated sequence of audio clips is based on user indication of selecting at least one icon of the one or more icons to generate the sequence.

6. The computing device of claim 1, wherein an audio clip of the one or more identified audio clips comprises a musical note, and wherein the providing of the control interface further comprises:

generating a plurality of repitched versions of the musical note, wherein the one or more channel interfaces comprises an interface with one or more icons corresponding to the plurality of repitched versions of the musical note, and wherein the user-generated sequence of audio clips is based on user indication of selecting at least one icon of the one or more icons to generate the sequence.

7. The computing device of claim 1, wherein the one or more channel interfaces comprises an interface displaying a plurality of user-generated sequences, each sequence of the plurality of user-generated sequences corresponding to the plurality of audio channels, and further comprising a selectable option enabling a user to chain the one or more sequences to generate a new sequence.

8. The computing device of claim 1, wherein the one or more channel interfaces comprises an interface displaying a plurality of user-generated sequences, each sequence of the plurality of user-generated sequences corresponding to the plurality of audio channels, and further comprising a selectable option enabling a user to mix the one or more sequences to generate a new audio track.

9. The computing device of claim 1, wherein the one or more channel interfaces comprises an interface displaying a pair of coordinate axes, wherein a horizontal axis corresponds to a plurality of pitch adjustments for the user-generated sequence, and a vertical axis corresponds to a plurality of simultaneously adjustable audio filter adjustments for the user-generated sequence.

10. The computing device of claim 1, wherein the one or more channel interfaces comprises an interface displaying a plurality of respective volume controls for the plurality of audio channels, wherein the plurality of respective volume controls enable a user to simultaneously control volume settings of each of the plurality of audio channels.

11. The computing device of claim 1, wherein the one or more channel interfaces comprises an interface displaying a first tool to adjust a tempo, a second tool to adjust a swing, and a third tool to adjust a root musical note, for an audio clip in the sequence of audio clips.

12. The computing device of claim 1, wherein the one or more channel interfaces comprises an interface displaying a plurality of video edit icons, and wherein user selection of a video edit icon of the plurality of video edit icons enables application of a video edit feature to a video clip of the sequence of video clips.

13. The computing device of claim 1, the functions further comprising:

identifying one or more second audio clips in a second initial content based on one or more second transient points in the second initial content; and enabling, via the control interface, a second user-generated sequence of second audio clips, wherein each second audio clip in the sequence of second audio clips is selected from the one or more identified second audio clips, wherein the generating of the new audiovisual content comprises generating a second sequence of video clips to correspond to the user-generated sequence of audio clips and the user-generated sequence of second audio clips.

14. The computing device of claim 1, wherein the transient points in the initial content comprise one or more of a transient location, a pause, or a cut.

15. The computing device of claim 1, wherein the identifying of the one or more audio clips in the initial content comprises identifying, in a soundtrack of the initial content, one or more of a melodic note, a percussive sound, a musical composition, an instrumental sound, a change in audio intensity, a silence, or a vocal phrase.

16. The computing device of claim 1, wherein the identifying of the one or more audio clips in the initial content is performed by a trained machine learning model.

17. The computing device of claim 1, wherein the identifying of the one or more audio clips further comprises:

identifying, by a trained machine learning model, a classification for an audio clip of the one or more audio clips;

generating, based on the classification, a visual label associated with the audio clip; and displaying, via the control interface, the visual label on a selectable icon corresponding to the audio clip.

18. The computing device of claim 1, further comprising:

providing user selectable virtual tabs to enable automatic upload of the new audiovisual content to a social networking site.

19. A computer-implemented method comprising:

capturing, by a content generation component of the computing device, initial content comprising co-captured video, and co-captured audio associated with the video;

identifying one or more audio clips in the audio associated with the video based on one or more transient points in the audio;

extracting, for each audio clip of the one or more identified audio clips, a corresponding video clip from the video of the initial content;

providing, via a graphical user interface of the computing device, a control interface to enable a user-generated sequence of audio clips, wherein each audio clip in the sequence of audio clips is selected from the one or more identified audio clips, and wherein the control interface comprises a plurality of selectable tabs corresponding to a plurality of audio channels, wherein user selection of a tab of the plurality of selectable tabs enables user access to one or more channel interfaces to interact with one or more of an audio clip or a video clip in the audio channel corresponding to the user selected tab;

generating new audiovisual content comprising a sequence of video clips to correspond to the user-generated sequence of audio clips, wherein each video clip in the sequence of video clips is the extracted corresponding video clip for each audio clip in the user-generated sequence of audio clips; and providing, by the control interface, the new audiovisual content.

20. An article of manufacture including a non-transitory computer-readable medium, having stored thereon program instructions that, upon execution by one or more processors of a computing device, cause the computing device to carry out operations comprising:

capturing, by a content generation component of the computing device, initial content comprising co-captured video, and co-captured audio associated with the video;

identifying one or more audio clips in the audio associated with the video based on one or more transient points in the audio;

extracting, for each audio clip of the one or more identified audio clips, a corresponding video clip from the video of the initial content;

providing, via a graphical user interface of the computing device, a control interface to enable a user-generated sequence of audio clips, wherein each audio clip in the sequence of audio clips is selected from the one or more identified audio clips, and wherein the control interface comprises a plurality of selectable tabs corresponding to a plurality of audio channels, wherein user selection of a tab of the plurality of selectable tabs enables user access to one or more channel interfaces to interact with one or more of an audio clip or a video clip in the audio channel corresponding to the user selected tab;

generating new audiovisual content comprising a sequence of video clips to correspond to the user-generated sequence of audio clips, wherein each video clip in the sequence of video clips is the extracted corresponding video clip for each audio clip in the user-generated sequence of audio clips; and providing, by the control interface, the new audiovisual content.

* * * * *